United States Patent [19]

Obara

[11] Patent Number: 5,204,857

[45] Date of Patent: Apr. 20, 1993

[54] ATM EXCHANGE SYSTEM

[75] Inventor: Keiichi Obara, Hachioji, Japan

[73] Assignee: Kabushiki Kaisha Toshiba, Kawasaki, Japan

[21] Appl. No.: 747,869

[22] Filed: Aug. 20, 1991

[30] Foreign Application Priority Data

Aug. 20, 1990 [JP] Japan .................................. 2-218762

[51] Int. Cl.⁵ ............................ H04J 3/02; H04J 3/12
[52] U.S. Cl. ................................... 370/60; 370/60.1; 370/79; 370/94.1; 370/94.2
[58] Field of Search ................. 370/60, 79, 94.2, 53, 370/94.1, 60.1

[56] References Cited

U.S. PATENT DOCUMENTS

| | | | |
|---|---|---|---|
| 4,926,416 | 5/1990 | Weik | 370/60.1 |
| 5,010,545 | 4/1991 | Jacob | 370/94.1 X |
| 5,119,370 | 6/1992 | Terry | 370/60.1 |

Primary Examiner—Douglas W. Olms
Assistant Examiner—Russell Blum
Attorney, Agent, or Firm—Finnegan, Henderson, Farabow, Garrett & Dunner

[57] ABSTRACT

An ATM exchange system capable of accommodation not only terminals of an ATM system but also terminals of an STM system at low cost. The ATM system includes an ATM channel switch for providing a direct exchange connection between the ATM terminal and an ATM trunk line, an STM channel switch for providing a direct exchange connection between the STM terminal and an STM trunk line, and an STM/ATM conversion module connected between the ATM channel switch and the STM channel switch and adapted to convert a call of one system to that of another system when a call is made between ATM terminal/line and STM terminal/line.

8 Claims, 20 Drawing Sheets

ATM EXCHANGE SYSTEM

BACKGROUND OF THE INVENTION

1. Field of the Invention

The present invention relates to an ATM (asynchronous transfer mode) exchange system, and more particularly to an ATM exchange system capable of accommodating a STM (synchronous transfer mode) communication terminal.

2. Description of the Related Art

As a conventional ATM exchange system, for instance, one shown in FIG. 20 is known. This ATM exchange system includes extension ATM terminal interfaces 211-21n to which extension ATM terminals 231-23n are respectively connected via extension cables 221-22n, and ATM trunk interfaces 241-24m to which ATM lines (external lines) 251-25m are respectively connected. It further includes an ATM channel switch 202 to which the extension ATM terminal interface 211-21n and the ATM trunk interfaces 241-24m are connected, and a call control unit 201 which controls the overall apparatus.

If all of the terminal equipments and lines are of the ATM system described above, the configuration shown in FIG. 20 is sufficient. However, if some terminal equipments are of the conventionally used STM system, it is necessary to provide STM/ATM converting units 361-36n having an adaptation function and a cell conversion function between the extension ATM terminal interfaces 311-31n and the extension STM terminals as shown in FIG. 21.

In FIG. 21, the STM/ATM converting unit 361 is disposed in the exchange, while the STM/ATM converting unit 36n is provided outside of the exchange as in the case of a terminal adapter (AT) in an ISDN.

However, with the above-described conventional ATM exchange system, if an attempt is made to accommodate terminal equipment of the STM system in an ATM exchange, the STM/ATM converting unit is required for each terminal. In the case of STM telephone communication, since the internal switch is of ATM system, all the terminals must be firstly converted to be of ATM system and then converted to be of STM system. Accordingly, the cost of the system becomes higher and no benefit can be found in applying ATM system compared with STM system.

In addition, in a case where a terminal is used to serve multiple media, it is necessary to change the cell converting function, such as an ATM adaptation layer format, in the STM/ATM converting unit for each call in correspondence with the attribute of each medium. However, if each STM/ATM converting unit is provided with all the cell converting functions in correspondence with all the media attributes, the STM/ATM converting unit becomes an extremely large circuit. This also contributes to increase the cost.

SUMMARY OF THE INVENTION

Accordingly, it is an object of the present invention to provide an ATM exchange system capable of accommodating not only a terminal of the ATM system but also a terminal of the STM system at low cost, thereby overcoming the above-described drawbacks of the conventional art.

To this end, in accordance with the present invention, there is provided an ATM exchange system in which STM terminals and STM trunk lines of an STM system and ATM terminals and ATM trunk lines of an ATM system are accommodated, comprising: an ATM channel switch for providing a direct exchange connection between the ATM terminal and the ATM trunk line; an STM channel switch for providing a direct exchange connection between the STM terminal and the STM trunk; and an STM/ATM conversion module disposed between the ATM channel switch and the STM channel switch, and adapted to convert a call of one system to that of another system when a call is made between ATM terminal/line and STM terminal/line.

In this invention, for STM terminals and STM trunk lines, for instance, STM/ATM conversion is made only when there is a need for conversion to ATM. In addition, the STM/ATM conversion module is not attached to each terminal, and can be shared in the form of a pool by all the terminals accommodated in the exchange. Hence, it is possible to obtain an economical ATM exchange capable of effecting conversion connection between STM and ATM.

Thus, in accordance with the present invention, since the STM channel switch and the ATM channel switch are provided, and the STM/ATM conversion module is disposed therebetween, the present terminals of the STM system can be accommodated in the ATM exchange at low cost.

The above and other objects, features and advantages of the present invention will become more apparent from the following detailed description of the invention when read in conjunction with the accompanying drawings.

DESCRIPTION OF THE PREFERRED

Referring now to the accompanying drawings, a description will be given of a preferred embodiment of the present invention.

Figure 1:
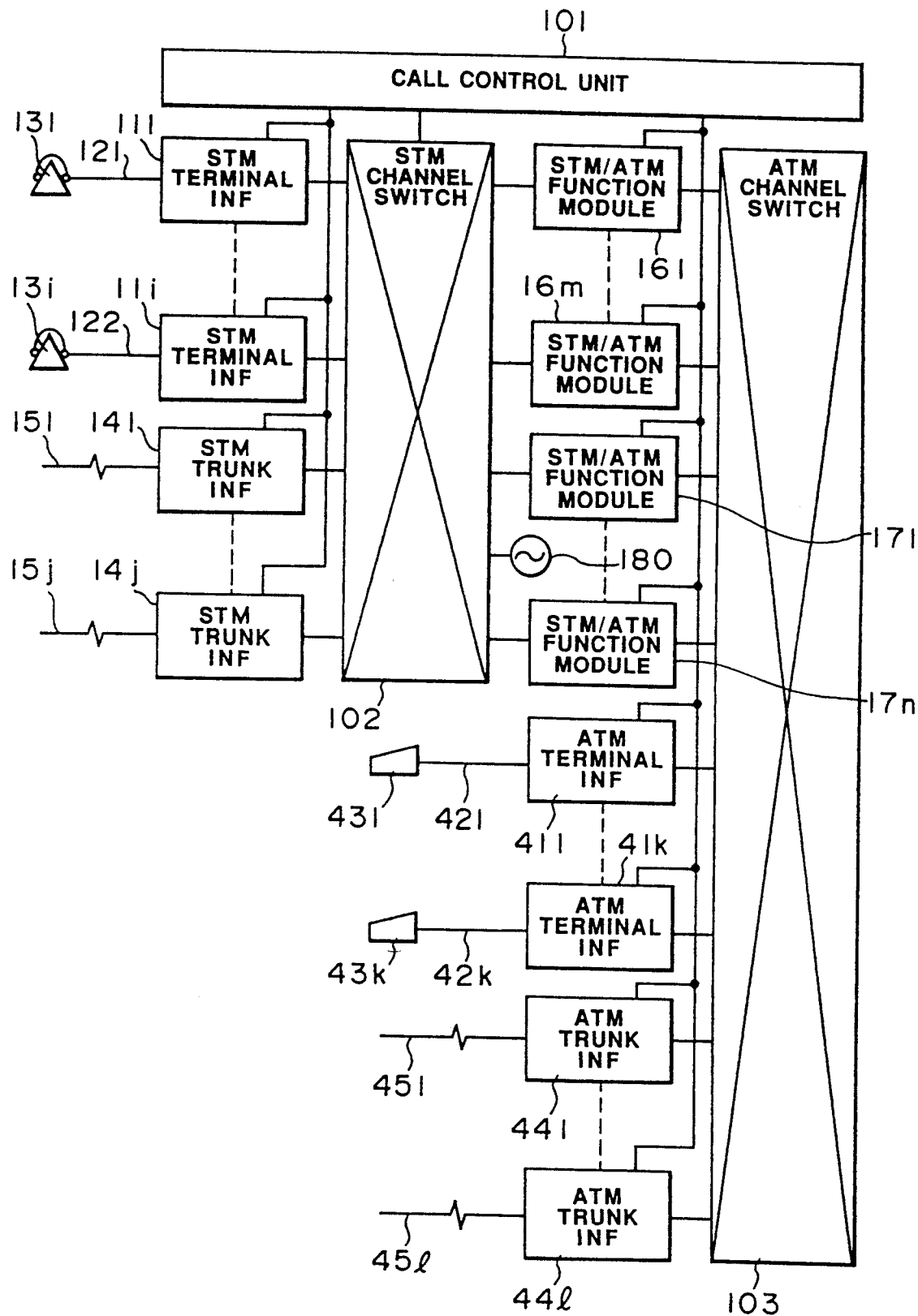
FIG. 1 is a block diagram of an embodiment of the prevent invention.
Figure 2:
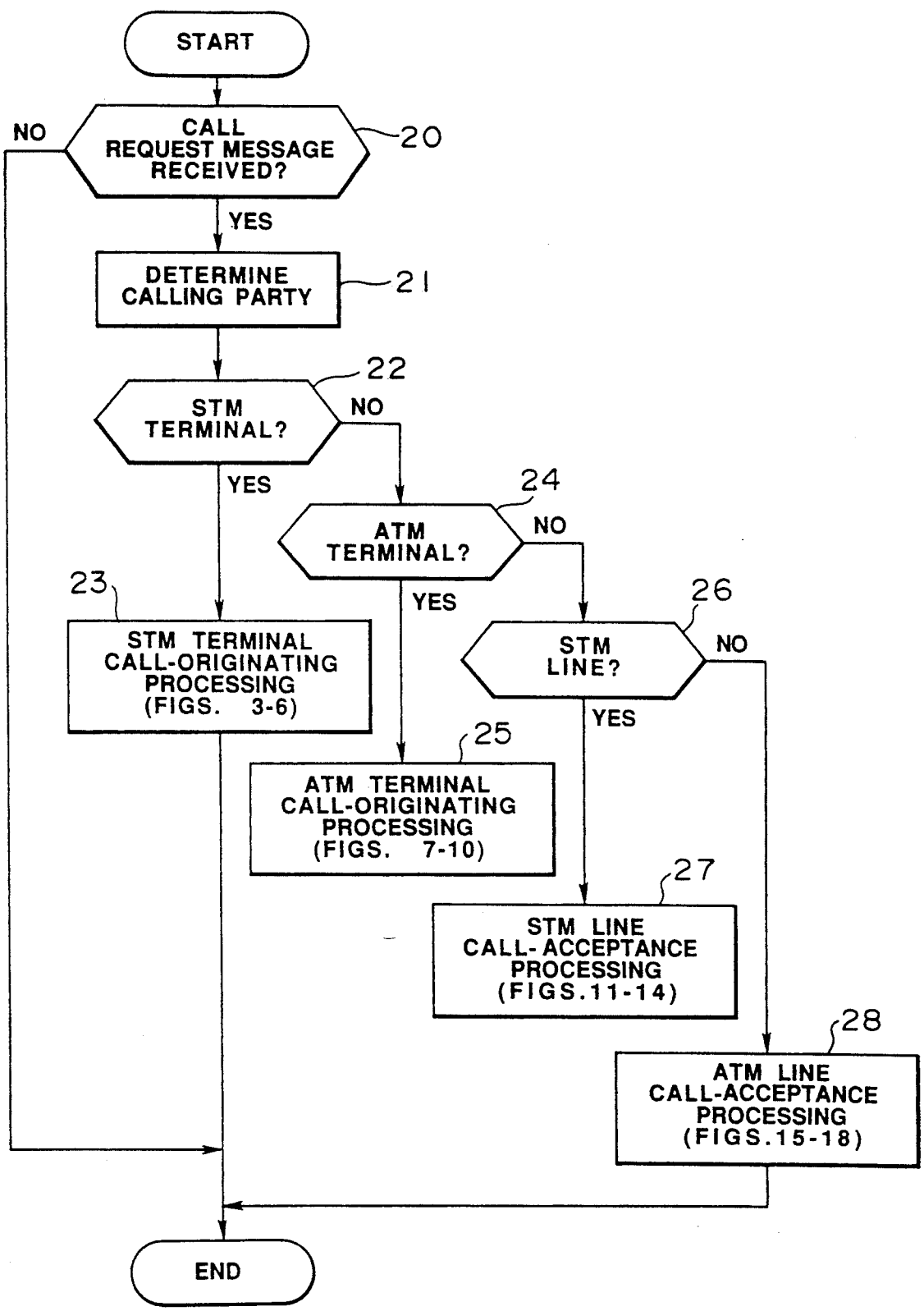
FIGS. 2 through 18 are flowcharts illustrating the operation concerning originating and terminating calls in accordance with the present invention.

FIG. 1 is a block diagram illustrating an electrical hardware configuration of an embodiment of the present invention;

First, a description will be given of the configuration. An STM channel switch 102 and an ATM channel switch 103 are connected to a call control unit 101 for controlling the overall apparatus.

Furthermore, connected to the STM channel switch 102 are STM terminal-accommodating interface units (STM terminal INFs) 111-11i and STM trunk interface units (STM trunk INFs) 141-14j. STM terminals 131-13i are respectively connected to the STM terminal INFs 111-11i via private lines (internal lines) 121-12i. Meanwhile, STM lines (external lines) 151-15i are respectively connected to the STM trunk INFs 141-14j.

In addition, a tone generator 180 for generating various tones, such as a busy tone and a ringback tone, is connected to the STM channel switch 102 so as to send tone signals to the STM terminal 131-13*i* and the STM lines 151-15*i*, as required.

Furthermore, connected to the ATM channel switch 103 are ATM terminal-accommodating interface units (ATM terminal INFs) 411-41*k* and ATM trunk interface units (ATM trunk INFs) 441-441. ATM terminals 431-43*k* are connected to the ATM terminal INF 411-41*k* via private lines (internal lines) 421-42*k*. Meanwhile, ATM Lines (external lines) 451-451 are connected to the ATM trunk INFs 441-441.

STM/ATM function modules 161-16*m* and 171-17*n*, which constitute two groups of modules having an adaptation function and a cell converting function, are connected between the STM channel switch 102 and the ATM channel switch 103. The former modules are adapted for a voice system, while the latter modules are adapted for a data system.

This embodiment is configured as described above. Procedures of processing executed by the call control unit 101 will now be described in detail with respect to each separate process with reference to FIGS. 2 to 19.

First, upon receiving a call request message, the call control unit 101 determines a sender (calling party) of the message (Steps 20, 21). If a determination is made that the calling party is an STM terminal (Step 22), the call control unit 101 executes STM terminal call processing shown in FIGS. 3-6 (Step 23). If a determination is made that the calling party is an ATM terminal (Step 24), the call control unit 101 executes ATM terminal call processing shown in FIGS. 7-10 (Step 25). If a determination is made that the calling party is an STM line (Step 26), the call control unit 101 executes STM line call acceptance processing shown in FIGS. 11-14 (Step 27). If a determination is made that the calling party is an ATM line (Steps 22, 24, 26), the call control unit 101 executes ATM line call acceptance processing shown in FIGS. 15-18 (Step 28).

Figure 3:
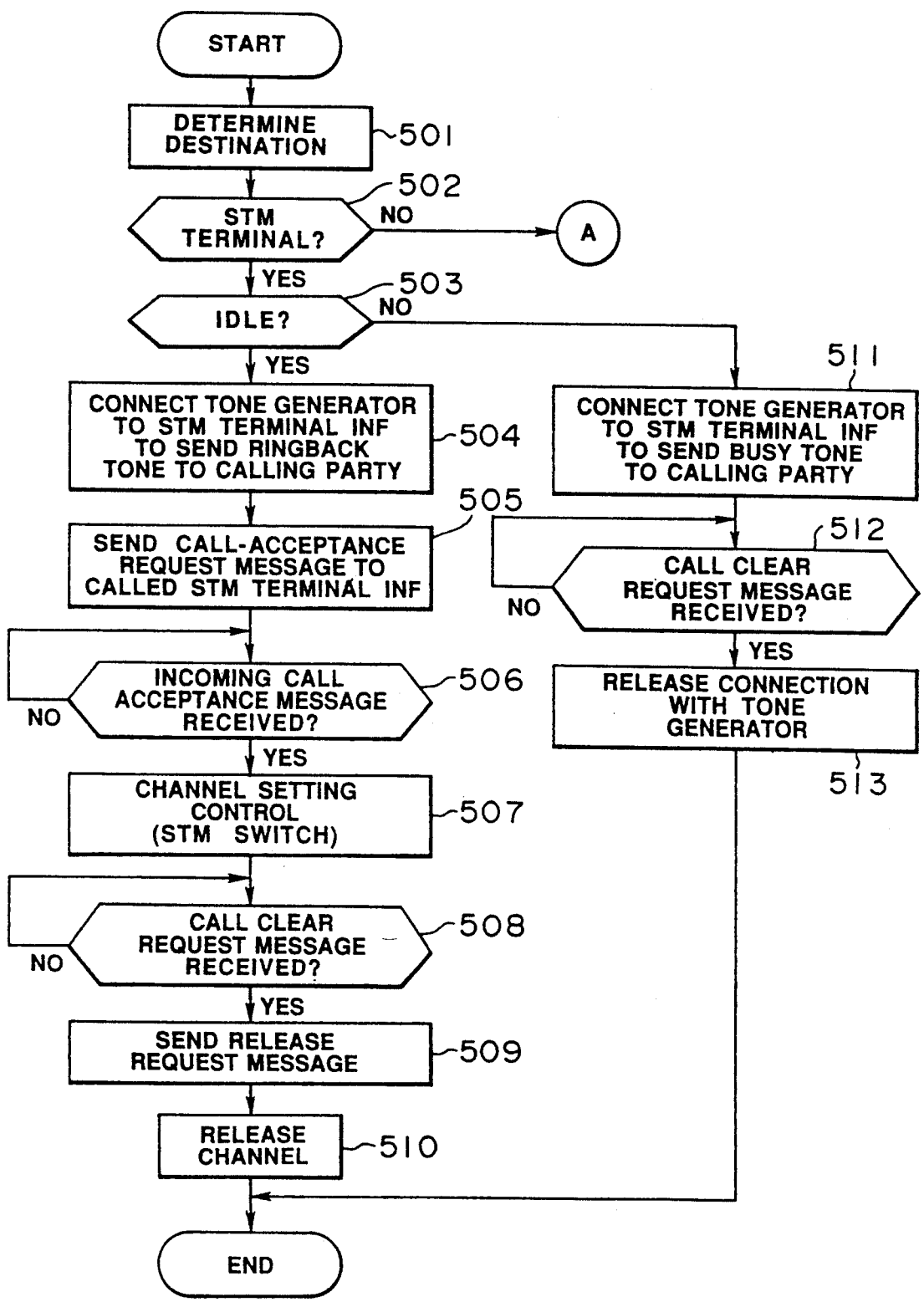

(1) When calling from an STM terminal to an STM terminal (FIG. 3)

Here, a description will be given of an example in which a call is made from the STM terminal 131 to the STM terminal 13*i*.

A call request signal from the STM terminal 131 is transmitted to the STM terminal INF 111 via the line 121 through an individual channel signalling system for an analog line or a common channel signalling system for an ISDN network. The call-request signal is interpreted by this INF, and is transmitted to the call control unit 101 as a call request message.

At this juncture, if the call control unit 101 recognizes by that call request message that a destination number represents a terminal connected directly to this exchange and that it is an STM terminal (Steps 501, 502), the call control unit 101 determines whether or not the called STM terminal is idle. If a determination is made that it is idle (Step 503), the call control unit 101 connects the tone generator 180 to the STM terminal INF 111 by means of the STM channel switch 102 so as to transmit a ringback tone to the call-originating STM terminal 131 (Step 504). In addition, the call control unit 101 transmits a call request message to the STM terminal INF 11*i* (Step 505).

If the call acceptance request message is sent to the STM terminal INF 11*i*, the STM terminal INF 11*i* calls the STM terminal 13*i* and transmits a message thereto. By virtue of this message, the STM terminal 13*i* effects the operation of generating a call tone. If the STM terminal 13*i* responds, the STM terminal INF 11*i* connects the channel between the private line 121 and the STM channel switch 102, and returns an incoming call acceptance message to the call control unit 101.

Thus, upon receiving the incoming call acceptance message (Step 506), the call control unit 101 sends a connection completion message to the STM terminal INF 111, whereby the STM terminal INF 111 connects the channel between the private lines 121 and 12*i*.

Furthermore, the call control unit 101 controls the STM channel switch 102, and sets an STM channel between the STM terminal INFs 111 and 11*i*. Connection processing is thus completed (Step 507).

Upon completion of the call, if the line is disconnected by, for instance, the STM terminal 131, the call control unit 101 receives a call clear request message via the STM terminal-accommodating INF 111 (Step 508), and sends a release request message to the STM terminal INF 11*i* so as to release the channel set in the STM channel switch 102, thereby returning to the initial state (Step 510).

It should be noted that if a determination is made that the called STM terminal is busy (Step 503), the call control unit 101 connects the tone generator 180 to the STM terminal INF 111 via the STM channel switch 102 so as to send a busy tone to the calling STM terminal 131 (Step 511). If the line is disconnected by the STM terminal 131, and upon receiving the call clear request message (Step 512), the call control unit 101 releases the channel set in the STM channel switch 102, thereby returning to the initial state (Step 513).

Figure 4:
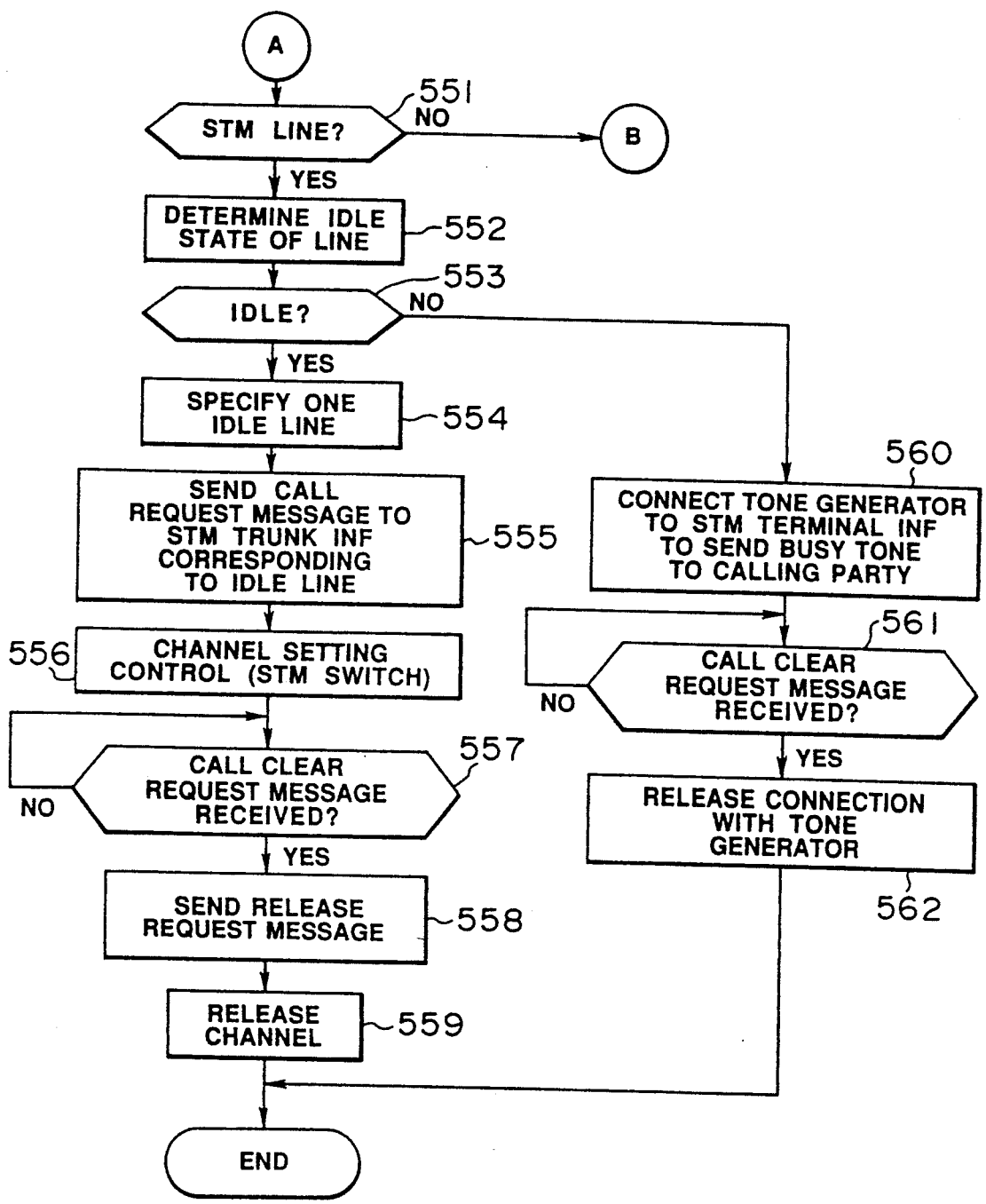

(2) When calling from an STM terminal to an STM trunk line (FIG. 4)

Here, a description will be given of an example in which a call is made by the STM terminal 131.

First, if a determination is made in the same processing procedure as in case (*1*) above that the called number is a terminal connected to either the office exchange or another PBX via an STM trunk line (Step 551), the call control unit 101 determines if there is any idle line among the STM lines 151-15*i* (Step 552). If it is determines that there is at least one idle line, the call control unit 101 specifies one line (Steps 553, 554). Subsequently, the call control unit 101 sends a call-request message to an STM trunk INF corresponding to that specified idle line (Step 555). In addition, the call control unit 101 instructs the STM channel switch 102 to set the STM channel between the STM terminal INF 111 and the STM trunk INF 141, thereby effecting channel setting control (Step 556).

The STM trunk INF 141 converts that message to a starting signal (calling signal) of an individual-channel or common-channel-signalling system, and sends the same to the STM trunk line 151. Concurrently, the channel set in the STM channel switch 102 is connected to the STM trunk line 151, thereby completing connection processing.

Meanwhile, if the line is disconnected by the STM terminal 131 because it is busy or upon completion of the call, the call control unit 101 receives a call clear request message via the STM terminal INF 111 (Step 557), whereupon the call control unit 101 sends a release request message to the STM trunk INF 141 (Step 558), thereby releasing the channel set in the STM channel switch 102 (Step 559).

As a result, the STM trunk INF 141 sends a disconnection signal of the individual-channel or common-channel signalling system to the STM trunk line 151, thereby completing call clear processing. The foregoing is the processing procedure in a case where a call is made from the STM terminal 131 to the STM trunk line.

If a determination is made that there is no idle STM circuit (Step 553), the call control unit 101 connects the tone generator 180 to the STM terminal INF 111 via the STM channel switch 102 so as to send a busy tone to the calling STM terminal 131 (Step 560).

Subsequently, when the line is disconnected by the STM terminal 131, and upon receiving a call clear request message (Step 561), the call control unit 101 releases the channel set in the STM channel switch 102, thereby returning to the initial state (Step 562).

Figure 11:
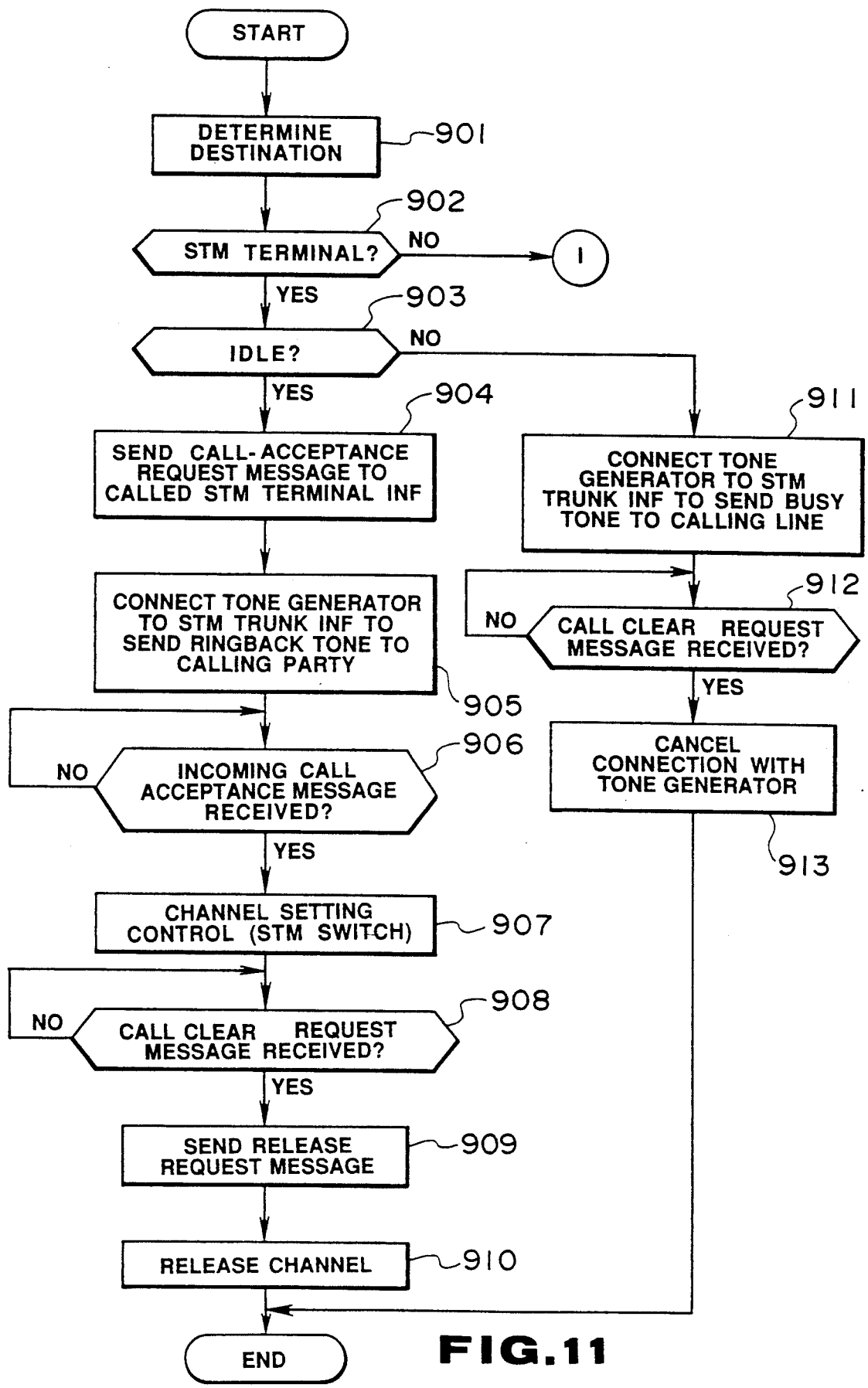

(3) When a call from an STM trunk line is terminated at an STM terminal (FIG. 11)

Here, a description will be given of an example in which a call from the STM trunk line 151 is terminated at the STM terminal 131. In addition, a description will be given by citing an example in which a call of the individual channel-signalling system is received from another PBX via its exclusive-use trunk line.

First, the STM trunk INF 141 which has received a call request from the STM trunk line 151 discriminates a reception number, and transmits a call request message to the call control unit 101.

Here, if the call control unit 101 determines that the destination number is a terminal connected directly to this exchange, and that it is an STM terminal (Steps 901, 902), the call control unit 101 determines whether or not the STM terminal 131, i.e., the destination, is idle. If a determination is made that it is idle (Step 903), the call control unit 101 sends a call-acceptance request message to the corresponding STM terminal INF 111 (Step 904). In addition, the call control unit 101 connects the tone generator 180 to the STM trunk INF 141 via the STM channel switch 102 so as to send a ringback tone to the calling line 151 (Step 905).

As a result, the STM terminal-accommodating INF 111 calls the STM terminal 131. If the STM terminal 131 responds, the STM terminal-accommodating INF 111 connects the channel between the corresponding private line 121 and the STM channel switch 102, and returns an incoming call acceptance message to the call control unit 101. Upon receiving this message, the call control unit 101 connects the STM terminal INF 111 to the STM trunk INF 141 via the STM channel switch 102. Concurrently, the call control unit 101 sends a connection completion message to the STM trunk INF 141, so that the STM trunk INF 141 connects the channel between the STM trunk line 151 and the STM channel switch 102, thereby completing connection processing (Steps 906, 907).

Subsequently, when the call is terminated, and if a disconnection signal is transmitted from, for instance, the STM trunk line 151, the STM trunk INF 141 sends a call clear request message to the call control unit 101, thereby releasing the channel between the STM trunk line 151 and the STM channel switch 102.

Upon receiving this call clear request message, the call control unit 101 instructs the STM channel switch 102 to release the channel set therein, and sends a release request message to the STM terminal INF 111, thereby completing call clear processing (Steps 909, 910).

The foregoing is the processing procedure in a case where a call from an STM trunk line is terminated at an STM terminal.

If a determination is made that the STM terminal is busy (Step 903), the call control unit 101 connects the tone generator 180 to the STM trunk INF 141 via the STM channel switch 102 so as to return a busy tone to the calling line 151 (Step 911). Subsequently, when a disconnection signal is obtained from the STM trunk line 151, and a call clear request message is received from the STM trunk INF 141 (Step 912), the call control unit 101 releases the channel set in the STM channel switch 102, thereby returning to the initial state (Step 913).

Figure 12:
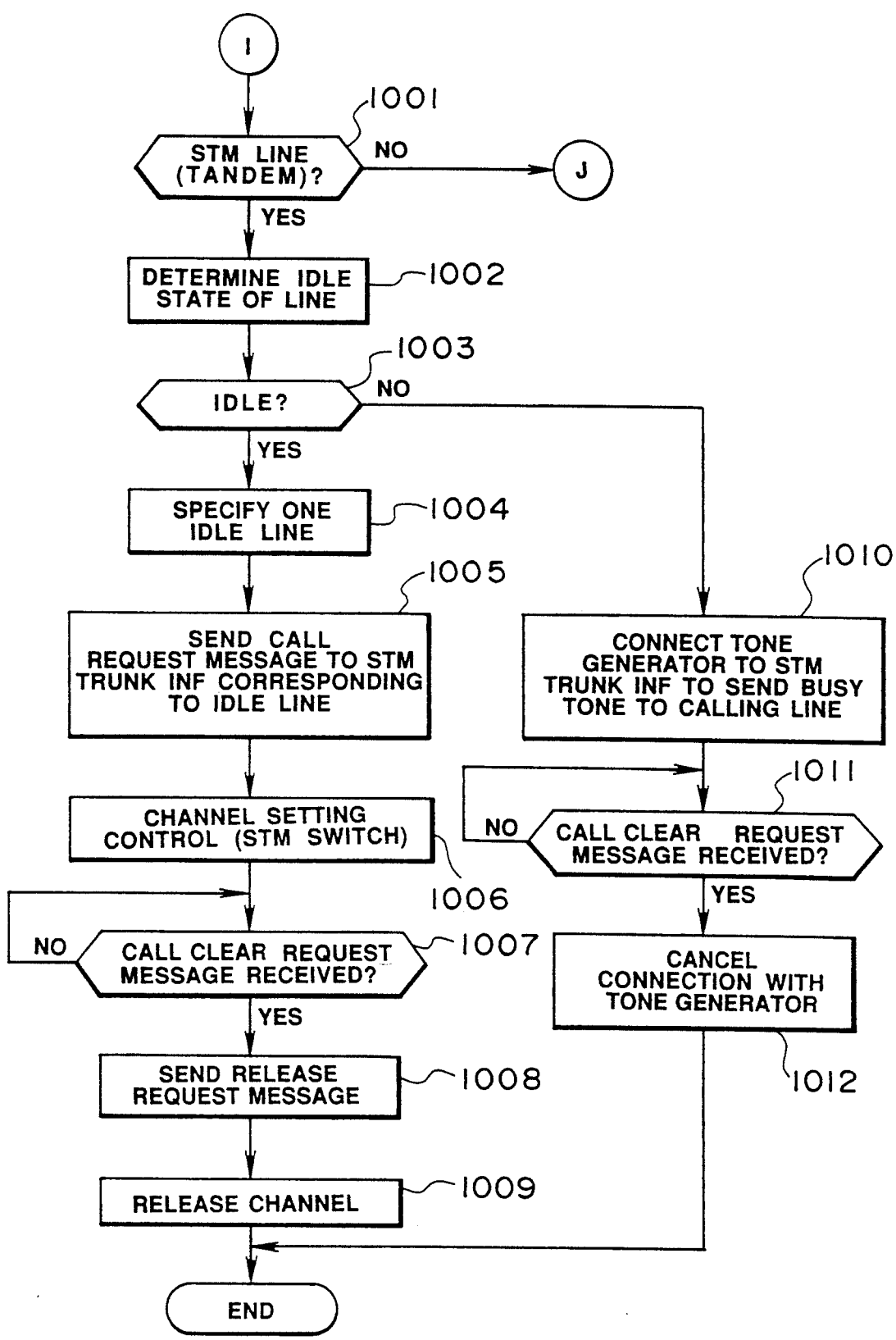

(4) When a tandem connection is made from an STM trunk line to another STM trunk line (FIG. 12)

In this case, as in the example of case (3) above, upon receiving a call request message from the STM trunk line 151, the call control unit 101 determines that the destination number represents a terminal which is not connected to this exchange, but that it is an STM terminal number (Step 1001). The call control unit 101 then determines whether there is any idle STM trunk line (Step 1002). If it is determined that there is at least one idle STM trunk line, one idle STM trunk line is specified (Steps 1003, 1004). Here, it is assumed that the STM trunk line 15i has been specified. Subsequently, the call control unit 101 sends a call request message to the STM trunk INF 14i (Step 1005).

As a result, the STM trunk INF 14i converts that message to a starting signal (calling signal) of the individual-channel signalling method, and sends the same to its exclusive-use STM trunk line 15j. In addition, the call control unit 101 controls the STM channel switch 102 to establish a connection between the STM trunk INFs 141 and 14i (Step 1006).

Then, upon receiving the call request message, the STM trunk INF 14i connects the channel set in the STM channel switch 102 to the STM trunk line 151, thereby completing connection processing.

Meanwhile, if the line is disconnected by, for instance, the STM terminal 151 because it is busy or upon completion of the call, the call control unit 101 receives a call clear request message from the STM trunk INF 141 (Step 1007), whereupon the call control unit 101 sends a release request message to the STM trunk INF 14j (Step 1008), thereby releasing the channel set in the STM channel switch 102 (Step 1009).

Then, the STEM trunk INF 14j creates a call clear request signal (disconnection signal) of the individual-channel-signalling system, and sends the same to the STM trunk line 15j, thereby completing call clear processing. The foregoing is the processing procedure in a case where a tandem connection is made from an STM line to another STM line.

If it is determined that there is no idle STM trunk line (Step 1003), the call control unit 101 executes busy processing in the same way as in Steps 911 913 in FIG. 11 (Steps 1010, 1012).

Figure 9:
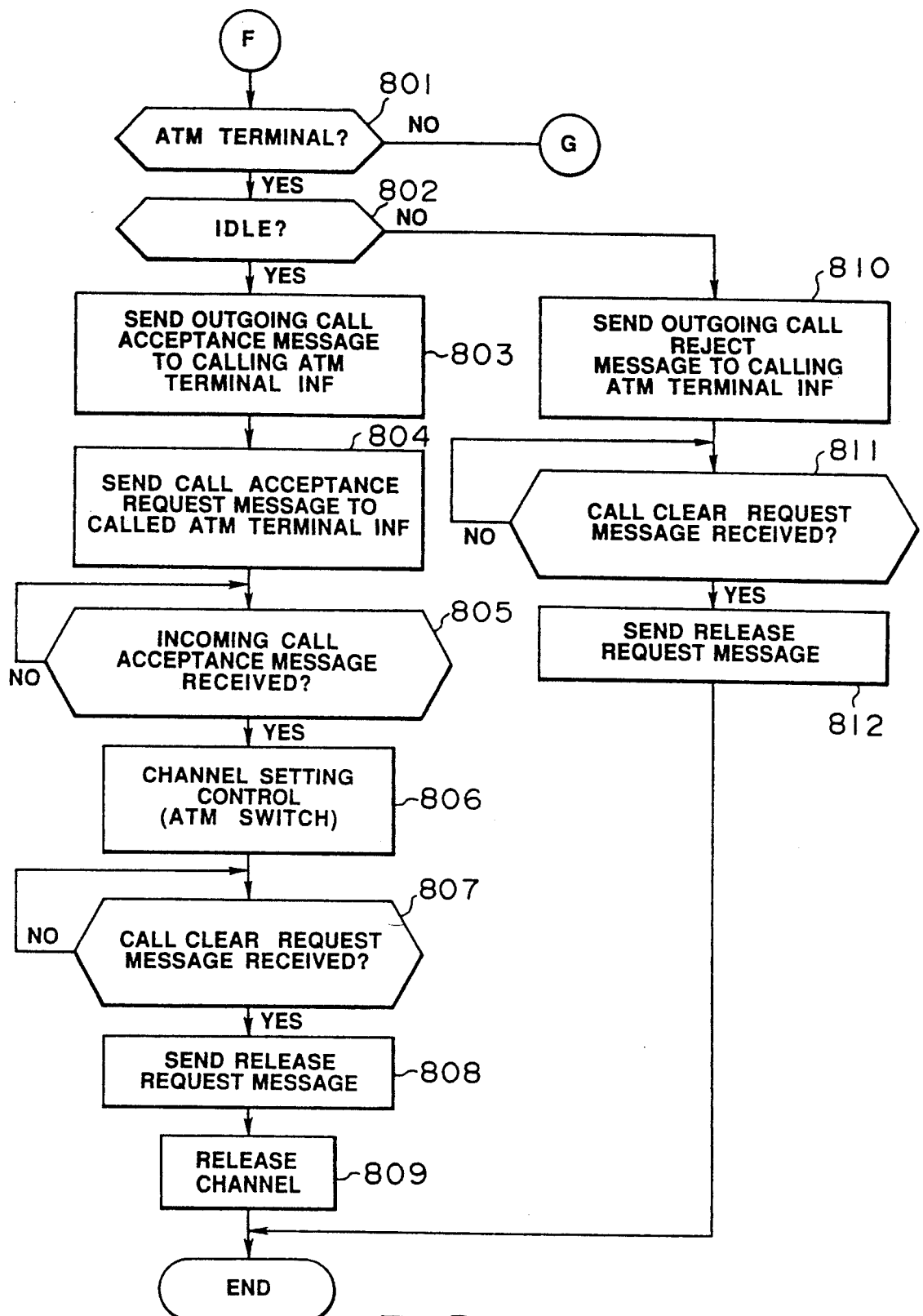

(5) When calling from an ATM terminal to another ATM terminal (FIG. 9)

Here, a description will be given by citing an example in which a call is made from the ATM terminal 431 to the ATM terminal 43k.

The procedure of this case is substantially same as that of the above-described case (1) in which a call is made from an STM terminal to another STM terminal.

Accordingly, although a detailed description will be omitted, the following readings are made in place of the description of case (1): The STM terminal 131 and 13i are read as the ATM terminals 431 and 43k; the STM terminals INF 111 and 11*i* are read as the ATM terminals INF 411 and 41*k*; the private lines 121 and 12*i* are read as the private lines 421 and 42*k*, and the STM channel switch 102 is read as the ATM channel switch 103.

However, although, in the case of an STM terminal, connection is controlled in such a manner that various tone signals are supplied to the STM terminal from the tone generator 180 connected to the STM channel switch 102, in the case of an ATM terminal, the terminal itself generates various audible sounds independently in correspondence with respective control messages. Accordingly, if the called ATM terminal is idle, the calling ATM terminal INF receives an outgoing call acceptance message from the call control unit 101 (Steps 802, 803). If the called ATM terminal is busy, the calling ATM terminal INF receives an outgoing call reject message therefrom (Steps 802, 810). On the basis of these messages, the calling ATM terminal issues a ringback tone in response to the acceptance message and a busy tone in response to the reject message through control from the ATM terminal INF.

Figure 10:
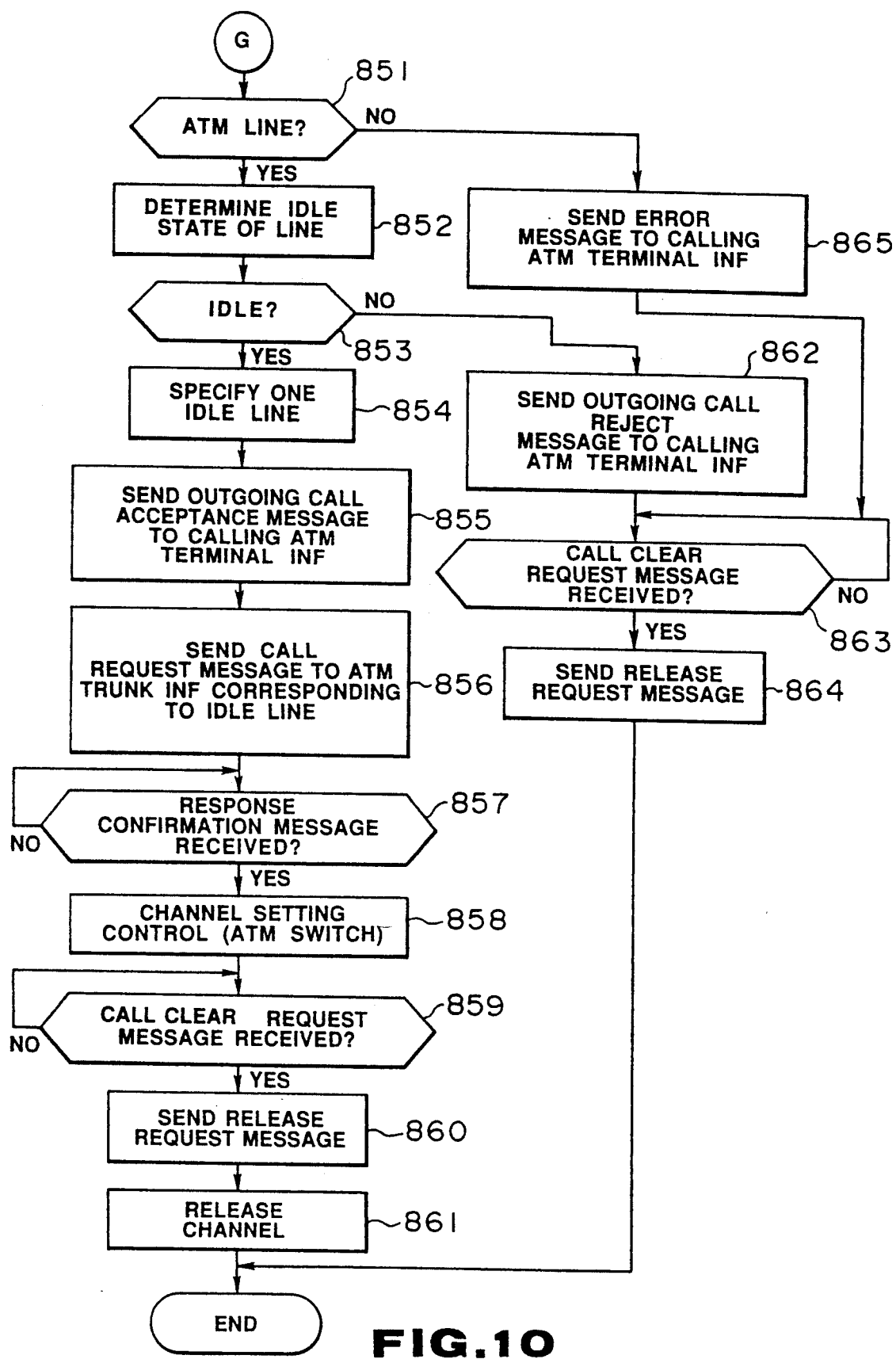

(6) When calling from an ATM terminal to an ATM trunk line (FIG. 10)

Here, a description will be given by citing an example in which a call is made from the ATM terminal 431 to the ATM trunk line 451.

The procedure of this case is substantially same as that of the above-described case (2) in which a call is made from an STM terminal to an STM trunk line.

Accordingly, although a detailed description will be omitted, the following readings are made in place of the description of case (2): The STM terminal 131 is read as the ATM terminal 431; the private line 121, as the private line 421; the STM terminal INF 111, as the ATM terminal INF 411; the STM trunk line 151, as the ATM trunk line 451; the STM trunk INF 141, as the ATM trunk INF 441; and the STM channel switch 102, as the ATM channel switch 103.

However, since the calling ATM terminal 431 issues various audible sounds independently, the call control unit 101 sends the following messages to the ATM terminal INF 411: an error message if the destination data of the call-originating message received is abnormal or the like (Step 865), an outgoing message reject message if there is no idle ATM trunk line (Step 862), and an outgoing message acceptance message if there is an idle ATM trunk line (Step 855). The ATM terminal INF 411 receives these messages, and controls the ATM terminal 431 so as to issue an error tone, a busy tone, and a ringback tone. However, in the case of calling an ATM trunk line, after the call control unit 101 sends a call request message to the ATM trunk INF (Step 856) and receives from the ATM trunk INF a response confirmation message that a connection can be established with the ATM trunk line (Step 857), the call control unit 101 effects ATM channel setting control (Step 858). Accordingly, the generation of a ringback tone is actually controlled in such a manner as to be effected in response to the receipt of this response request message.

If the call control unit 101 detects any error through the call control processing of selecting a channel in an ATM trunk such that the destination number is out of form (illegal), the call control unit 101 effects control, though not shown, so as to cause the ATM terminal 43 to issue an error tone.

Figure 17:
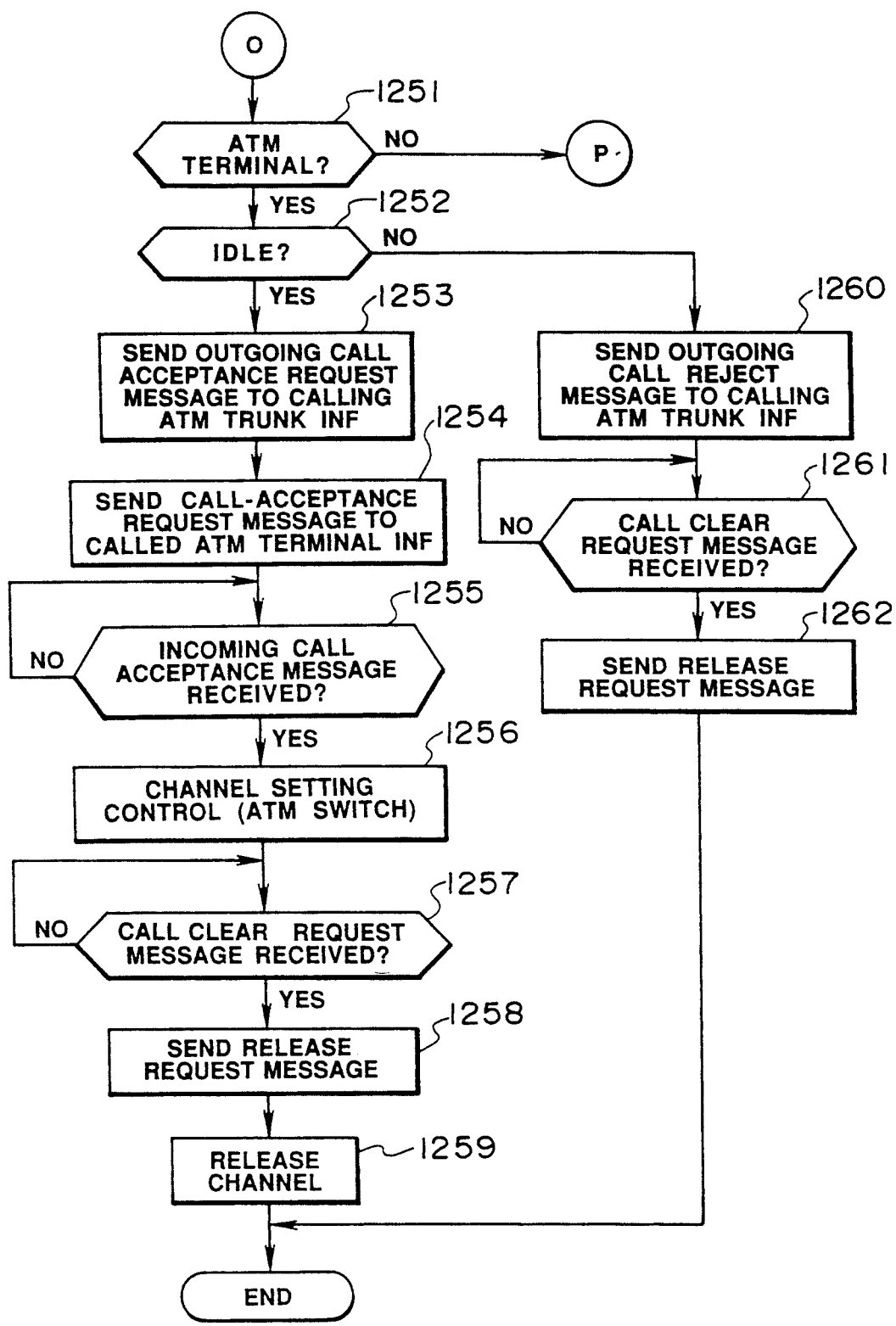

(7) When a call from an ATM trunk line is terminated at an ATM terminal (FIG. 17)

Here, a description will be given by citing an example in which a call from the ATM trunk line 451 is terminated at the ATM terminal 431.

The procedure of this case is substantially same as that of the above-described case (3) in which a call from a STM trunk line is terminated at a STM terminal.

Accordingly, although a detailed description will be omitted, the following readings are made in place of the description of case (3): The STM terminal 131 is read as the ATM terminal 431; the private line 121, as the private line 421; the STM terminal INF 111, as the ATM terminal INF 411; the STM trunk line 151, as the ATM trunk line 451; the STM trunk INF 141, as the ATM trunk INF 441; and the STM channel switch 102, as the ATM channel switch 103.

However, the call control unit 101 sends to the calling ATM trunk INF 441 an outgoing call reject message if the called ATM terminal 431 is busy (Step 1260), and an outgoing call acceptance message if the called ATM terminal 431 is idle. On the basis of these messages, the ATM trunk INF 441 sends a control message to the ATM trunk line 451, and these messages are transmitted to the calling-side ATM exchange system. Accordingly, the calling side is capable of ascertaining the acceptance state. If the called ATM terminal 431 is idle, after the call control unit 101 sends a call acceptance request message to the ATM terminal INF 411 (Step 1254), and receives an incoming call acceptance message from the ATM terminal INF 411 on the basis of a response from the ATM terminal 431 (Step 1255), the call control unit 101 executes ATM channel setting control (Step 1256).

Figure 18:
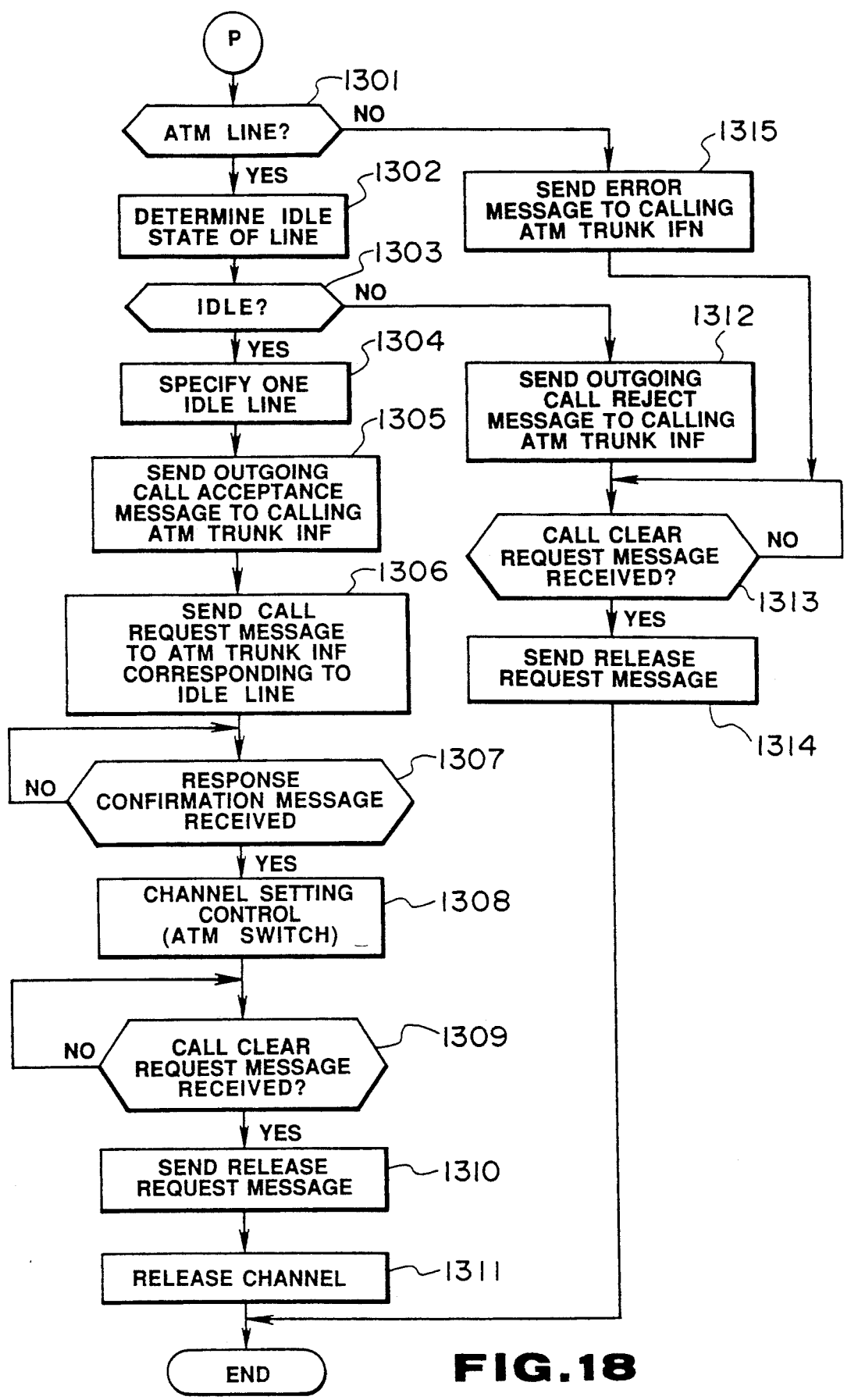
Figure 19:
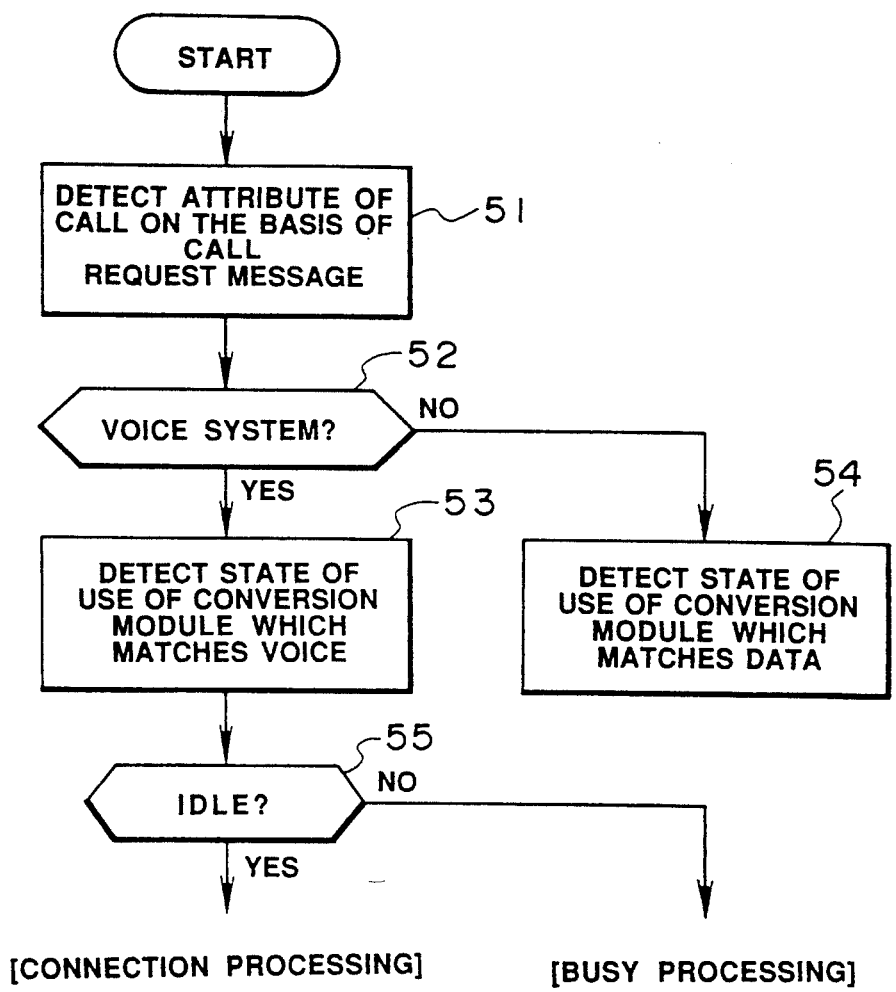
FIG. 19 is a flowchart illustrating the operation of selection by an STM/ATM converting function module.
Figure 20:
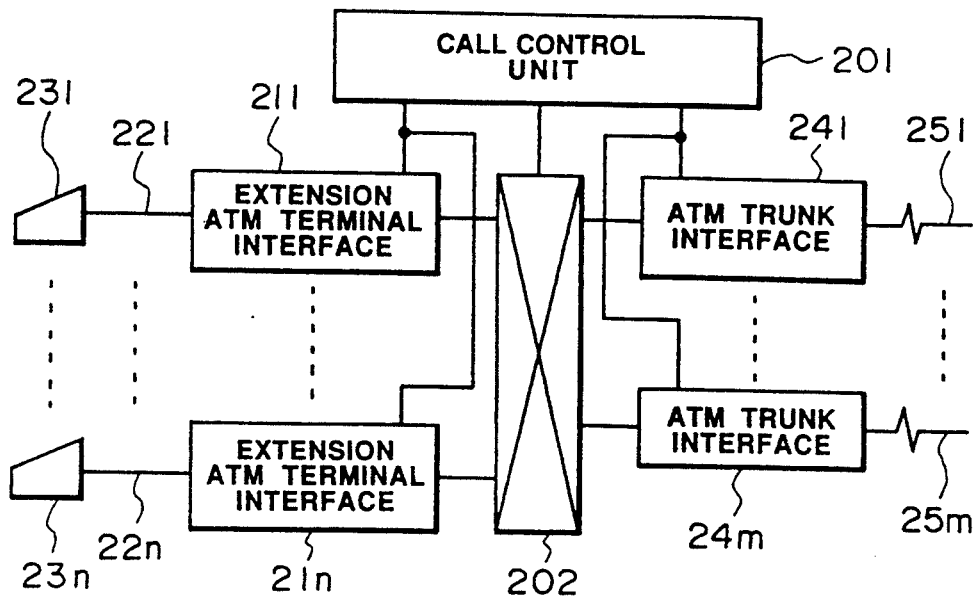
FIG. 20 and 21 are block diagrams illustrating ATM exchanges in conventional examples.
Figure 21:
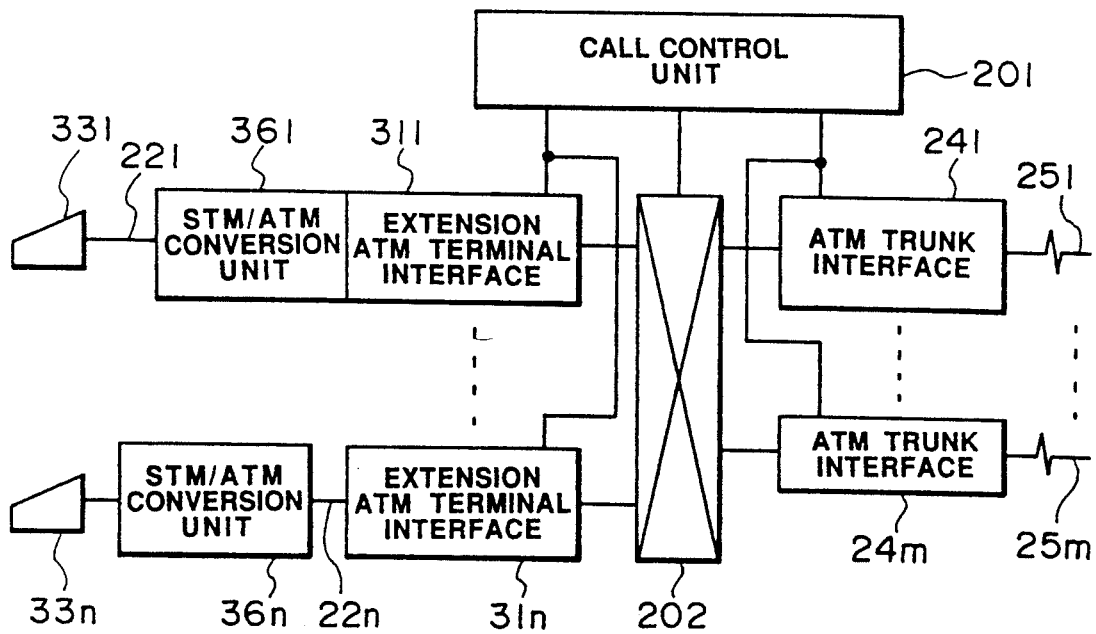

(8) When a tandem connection is made from an ATM trunk line to another ATM trunk line (FIG. 18)

Here, a description will be given by citing an example of a tandem connection from the ATM trunk line 451.

The procedure of this case is substantially same as that of case (4) in which a tandem connection is made from a STM trunk line to another STM trunk line.

Accordingly, although a detailed description will be omitted, the following readings are made in place of the description of case (4): The STM trunk lines 151 and 15*j* are read as the ATM trunk lines 451 and 451; the STM trunk INFs 141 and 14*j* are read as the ATM trunk INFs 441 and 44*i*; and the STM channel switch 102 is read as the ATM channel switch 103.

In this case, as in the case of generating a call to an ATM trunk line (FIG. 10), call generation processing is effected with respect to an idle ATM trunk line, and an outgoing call acceptance message or an outgoing call reject message is sent to the calling ATM trunk line 451 via the ATM trunk INF 441 (Steps 1305, 1312). In addition, if a determination is made that there is an abnormality in the destination data or the like in the call request message obtained from the calling ATM trunk line 451, the call control unit 101 sends an error message to the ATM trunk INF 441 so as to notify an error to the ATM trunk line 451.

Figure 5:
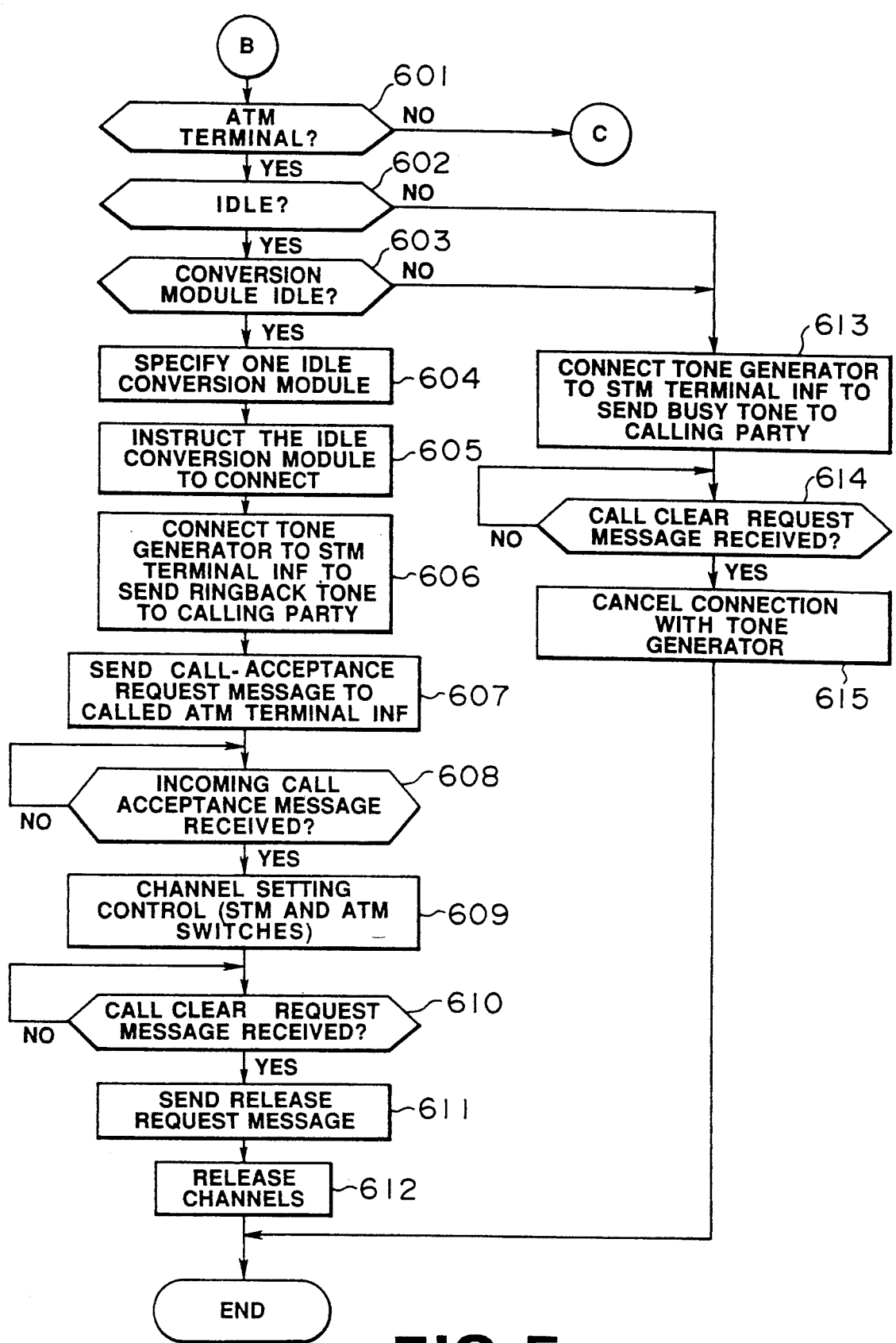

(9) When calling from an ATM terminal to an ATM terminal (FIG. 5)

Here, a description will be given by citing an example in which a call is made from the STM terminal 131 to the ATM terminal 431.

In this processing, the calling signal from the STM terminal 131 is first detected by the STM terminal INF 111 via the private line 121. As a result, a call request is generated by the STM terminal INF 111, and the message is sent to the call control unit 101.

Meanwhile, if the call control unit 101 determines on the basis of the message thus sent thereto that the destination number represents a terminal connected directly to this exchange, and that it is an ATM terminal (Step 602), the call control unit 101 further detects whether or not that ATM terminal is idle (Step 602). Subsequently, if a determination is made that the ATM terminal is idle (Step 602), the call control unit 101 detects the idle states of the STM/ATM conversion modules 161-16m, 171-17m in accordance with the flow shown in FIG. 19.

In this embodiment, two groups (voice system and data system) of STM/ATM conversion modules 161-16m, 171-17m are provided so as to effect STM/ATM conversion in correspondence with the media attribute of the call. If the media attribute of the STM calling party is examined by the call control unit 101 through the call request message (Step 51), either of the groups of modules matching the media attribute is selected from the two groups, modules 161-16m (hereinafter referred to as Group A) and modules 171-17m (hereinafter referred to as Group B) (Step 52). The state of use of the modules of Group A or Group B thus selected is detected (Steps 53, 54), and one idle STM/ATM conversion function module is selected (Step 55). Incidentally, if there is no idle module, busy processing is executed.

Accordingly, if the attribute of the call is discriminated by the call control unit 101, as described above, it follows that one STM/ATM conversion function module in Group A or Group B is designated in accordance with that attribute (Step 604).

If it is now assumed that the STM/ATM conversion function module is selected from, for instance, Group A (voice system), the call control unit 101 instructs the module 161 to connect the STM channel switch 102 to the ATM channel switch 103 (Step 605), and controls the STM channel switch 102 in such a manner as to connect the tone generator 180 to the STM terminal INF 111 so as to send a ringback tone to the calling STM terminal 131 (Step 606). In addition, the call control unit 101 sends a call acceptance request message to the called ATM terminal INF 411 (Step 607), and the ATM terminal 431 effects ringing processing in response to it. Subsequently, if a response is made, the call control unit 101 receives an incoming call acceptance message via the ATM terminal INF 411 (Step 608). Then, the call control unit 101 instructs the STM channel switch 102 to set the channel between the STM terminal INF 111 and the STM/ATM conversion function module 161, and also instructs the ATM channel switch 103 to set the channel between the ATM terminal INF 411 and the STM/ATM conversion function module 161, thereby effecting channel setting control.

In addition, the channel between the private line 421 and the ATM channel switch 103 is also connected by a response from the ATM terminal 431, thereby completing connection processing.

Meanwhile, upon completion of the call, and if the line is disconnected by, for instance, the STM terminal 131, a call clear request message is issued by the STM terminal INF 111 to the call control unit 101. As a result, the call control unit 101 releases the channel set in the STM channel switch 102 and the channel set in the ATM channel switch 103, resets the STM/ATM conversion function module 161, and sends a release request message to the STM terminal INF 111, thereby returning to the initial state (Steps 611, 612).

If the called ATM terminal is busy, or if there is no module matching the attribute, the same processing as busy processing shown in FIG. 4 is executed.

Figure 6:
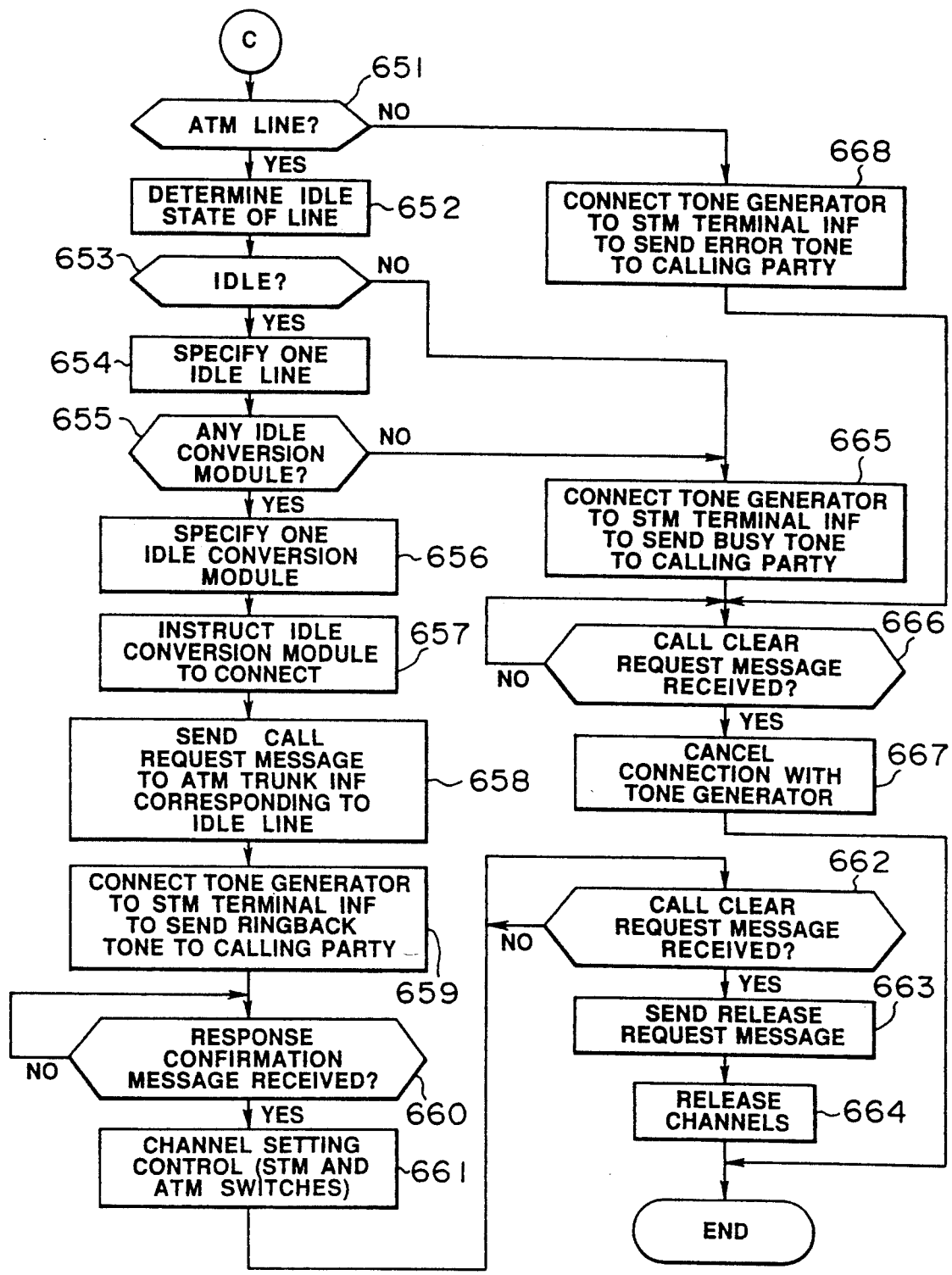

(10) When calling from an STM terminal to an ATM trunk line (FIG. 6)

Here, a description will be given by citing an example in which a call is made from the STM terminal 131 to an ATM trunk line.

In this case, a calling signal from the STM terminal 131 is detected by the STM terminal INF 111 via the private line 121, with the result that a call-originating request message generated by the STM terminal INF 111 is transmitted to the call control unit 101.

Meanwhile, if the call control unit 101 determines that the destination number contained in the call request message represents a terminal which is not directly connected to this exchange, and that a call can be made to an ATM trunk line (Step 651), the call control unit 101 detects if there is any idle ATM trunk line, and specifies one idle line (Steps 652-654). Furthermore, the call control unit 101 examines the attribute of that call through the call acceptance request message.

Thus, when the attribute of the call is examined by the call control unit 101, a group of modules matching that attribute is selected from Group A and B of STM/ATM conversion function modules, and one idle module is selected from the selected group of modules (Steps 655-657).

It is now assumed that the STM/ATM conversion function module 161 has been designated. Subsequently, the call control unit 101 sends a call request message to an ATM trunk INF corresponding to the idle ATM trunk line (Step 658), and effects control in such a manner as to supply a ringback tone to the calling STM terminal 131 (Step 659). Upon receiving a response confirmation message from the ATM trunk line via the ATM trunk INF, the call control unit 101 instructs the STM channel switch 102 to set the STM channel between the STM terminal INF 111 and the STM/ATM conversion function module 161. Concurrently, the call control unit 101 instructs the ATM channel switch 103 to set the ATM channel between the ATM trunk INF 441 and the STM/ATM conversion function module 161, thereby effecting channel setting control (Step 661).

The specified idle ATM trunk INF 441 converts the call request message to a starting signal (calling signal) of the common-channel-signalling method in the ATM system and sends the same to the ATM trunk line.

Meanwhile, if the line is disconnected by the STM terminal 131 because it is busy or upon completion of the call, a call clear request message is sent from the STM terminal INF 111 to the call control unit 101 (Step 662), whereupon the call control unit 101 releases the channels set in the STM channel switch 102 and the ATM channel switch 103, resets the STM/ATM conversion function module 161, and sends a release request message to the ATM trunk INF 441 (Steps 663, 664).

As a result, the ATM trunk INF 41 sends a disconnection signal of the common-channel-signalling method in the ATM system to the ATM trunk line 451, thereby completing a call clear request.

As for error processing in a case where there has been abnormal noise in the call request message received from the called party, and as for busy processing in a case where there is no idle ATM trunk line or there is no idle module, such processing is effected by the call control unit 101 by controlling the STM channel switch 102 so as to connect the tone generator 180 and the calling STM terminal 131 (Steps 665–668).

Figure 7:
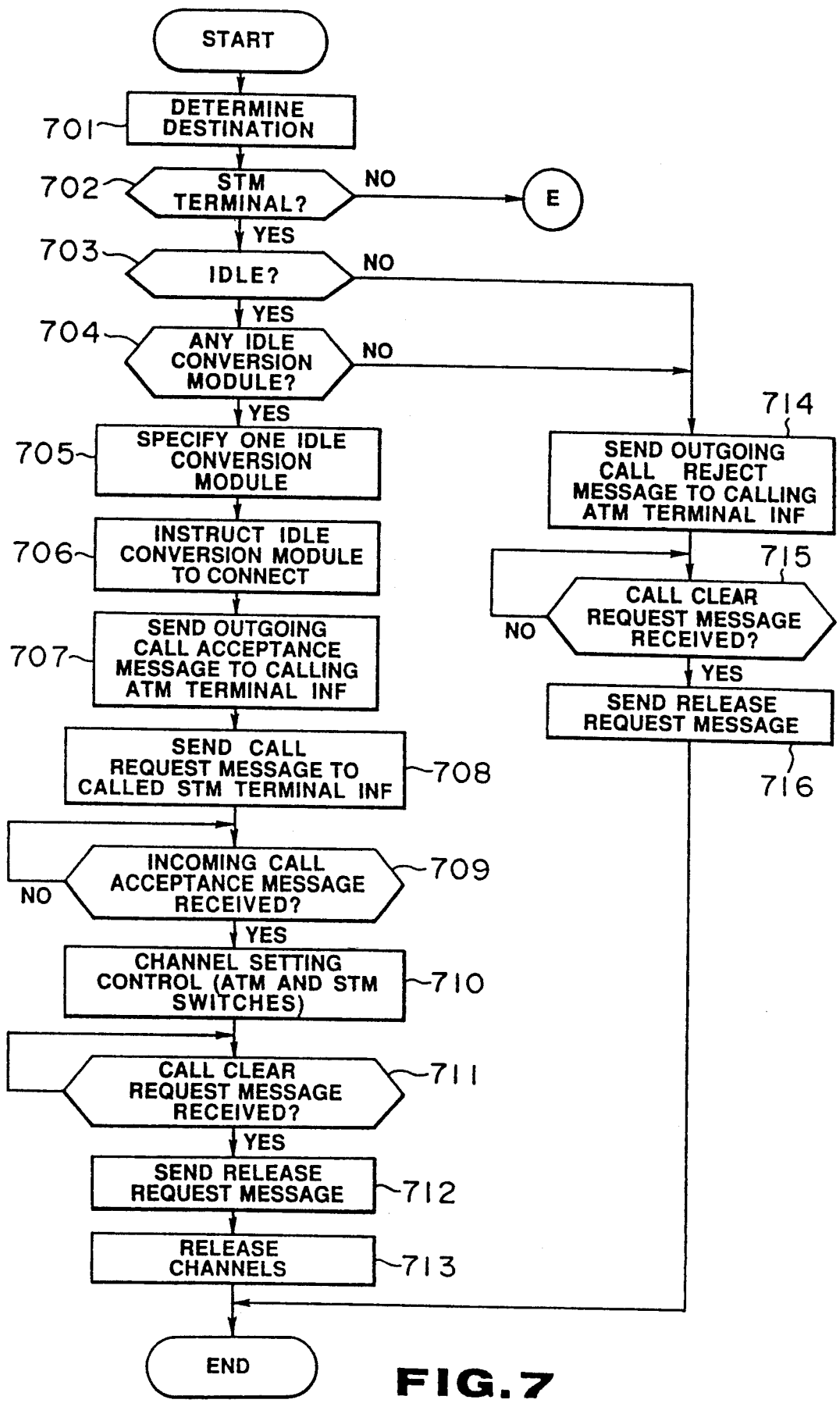

(11) When calling from an ATM terminal to an STM terminal (FIG. 7)

Here, a description will be given by citing an example in which a call is made from the ATM terminal 431 to the STM terminal 131.

The procedure of this case is substantially same as that of the above-described case (9) in which a call is made from an STM terminal to an ATM terminal.

Accordingly, although a detailed description will be omitted, the following readings are made in place of the description of case (9): The STM terminal 131 is read as the ATM terminal 431; the private line 121, as the private line 421; the STM terminal INF 111, as the ATM terminal INF 411; and the STM channel switch 102, as the ATM channel switch 103.

In this case, since the calling party is an ATM terminal, the calling party itself generates various tones, control is provided such that an outgoing call acceptance/reject message is sent to a corresponding ATM terminal INF so as to allow the ATM terminal to generate the tones.

Figure 8:
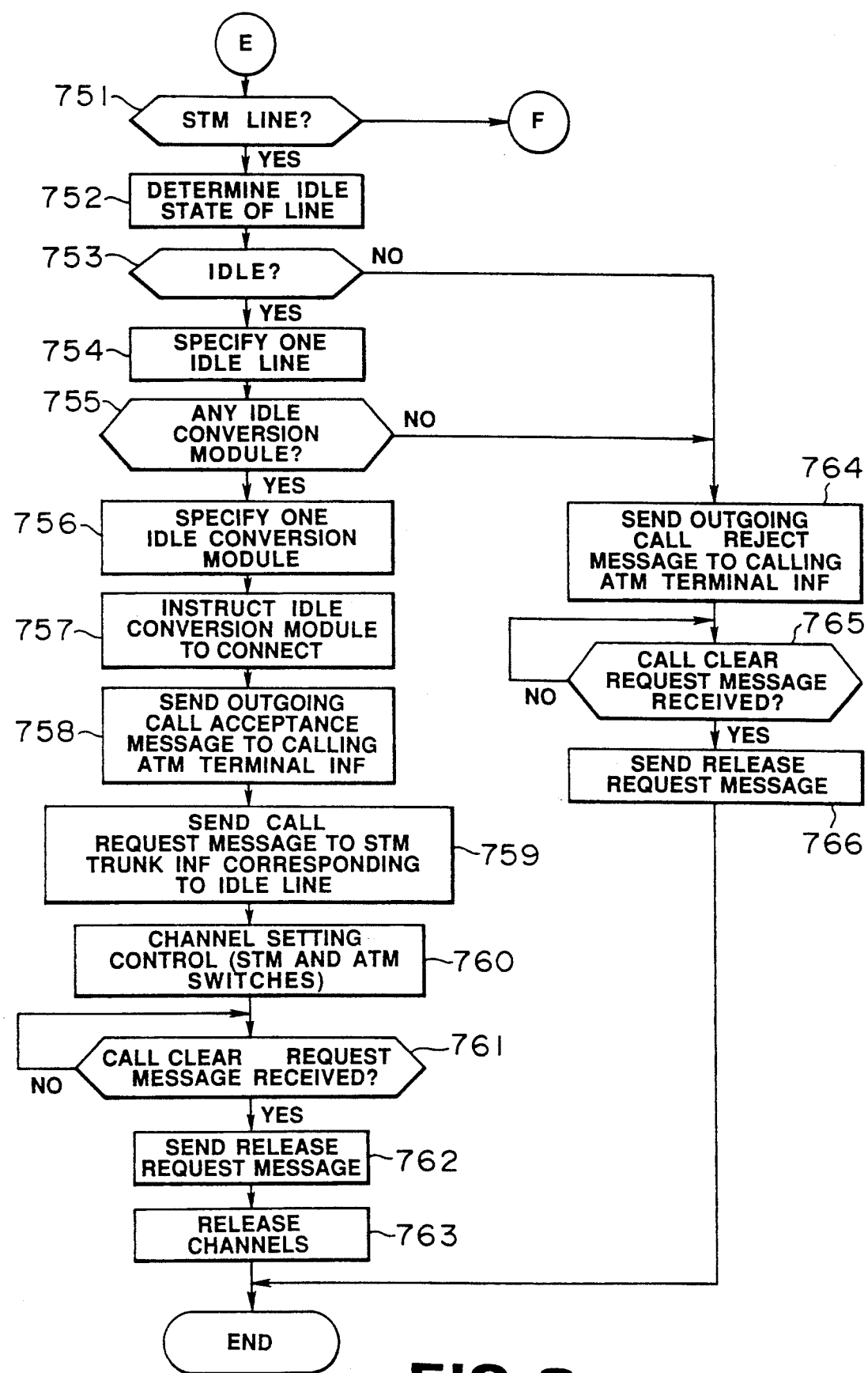

(12) When calling from an ATM terminal to an STM trunk line (FIG. 8)

Here, a description will be given by citing an example in which a call is made from the ATM terminal 431 to an STM trunk line.

The procedure of this case is identical with that of the above-described case (10). Accordingly, although a detailed description will be omitted, the following readings are made in place of the description of case (10): The STM terminal 131 is read as the ATM terminal 431; the private line 121, as the private line 421; the STM terminal INF 111, as the ATM terminal INF 411; the ATM trunk line 451, as the STM trunk line 151; the ATM trunk INF 441, as the STM trunk INF 141; and the STM channel switch 102, as the ATM channel switch 103.

In this case, since the calling party is an ATM terminal, the ATM terminal itself generates various tones, so that control is provided such that an outgoing call acceptance/reject message is sent to a corresponding ATM terminal INF so as to allow the ATM terminal to generate the tones. In addition, after a call request message is sent to the STM trunk line, and a channel is established, a ringback tone obtained from the STM trunk line is received by the ATM terminal via the channel so as to generate a tone. If this arrangement is provided, the sound of the ringback tone changes, so that it is possible to ascertain the point to which the connection is made. It should be noted that an arrangement may be provided such that only a ringback tone from the STM trunk line is generated.

Figure 13:
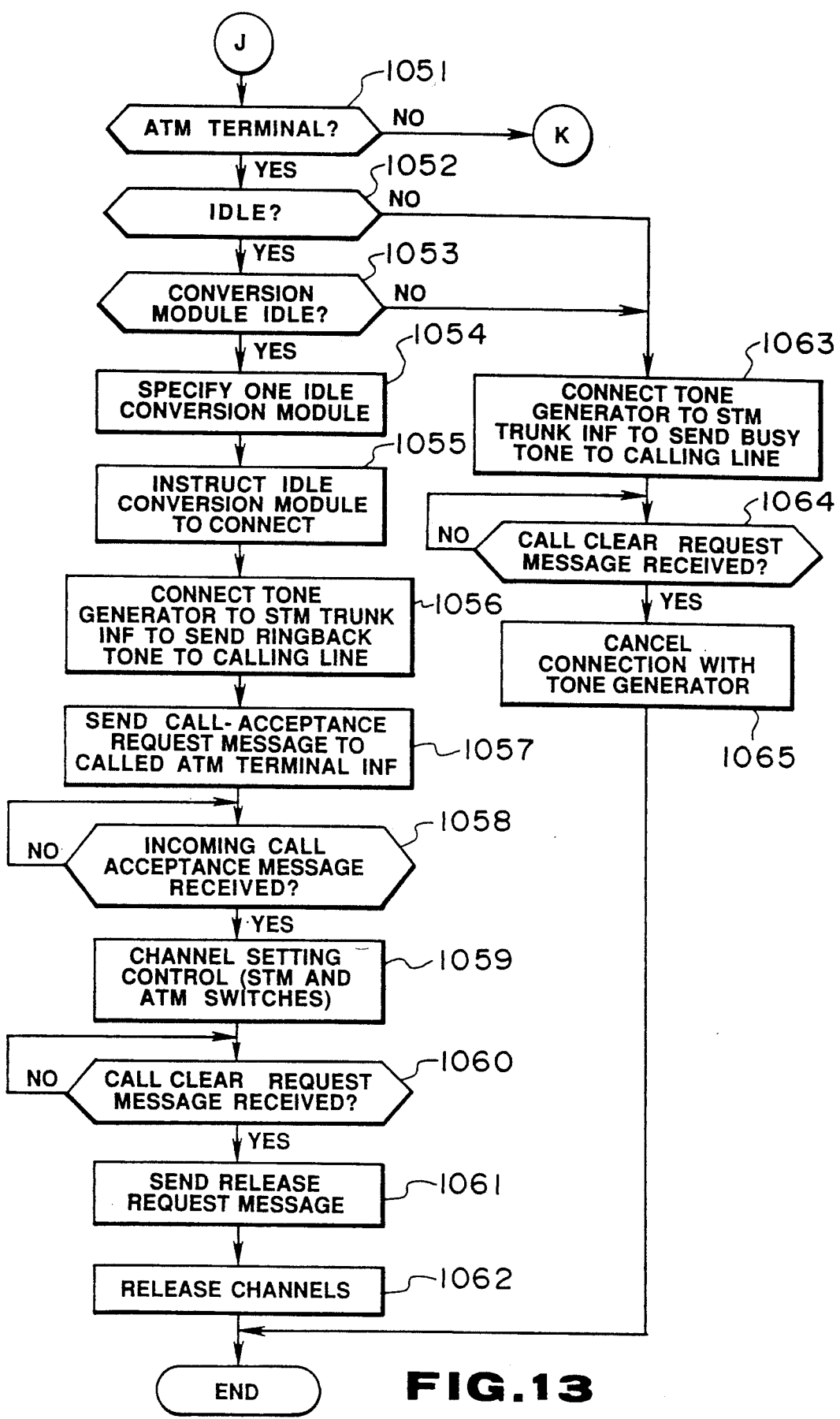

(13) When calling from an STM trunk line to an ATM terminal (FIG. 13)

The procedure of this case is substantially same as that of the above-described case (9) in which a call is made from an STM terminal to an ATM terminal. Accordingly, a detailed description will be omitted.

Figure 15:
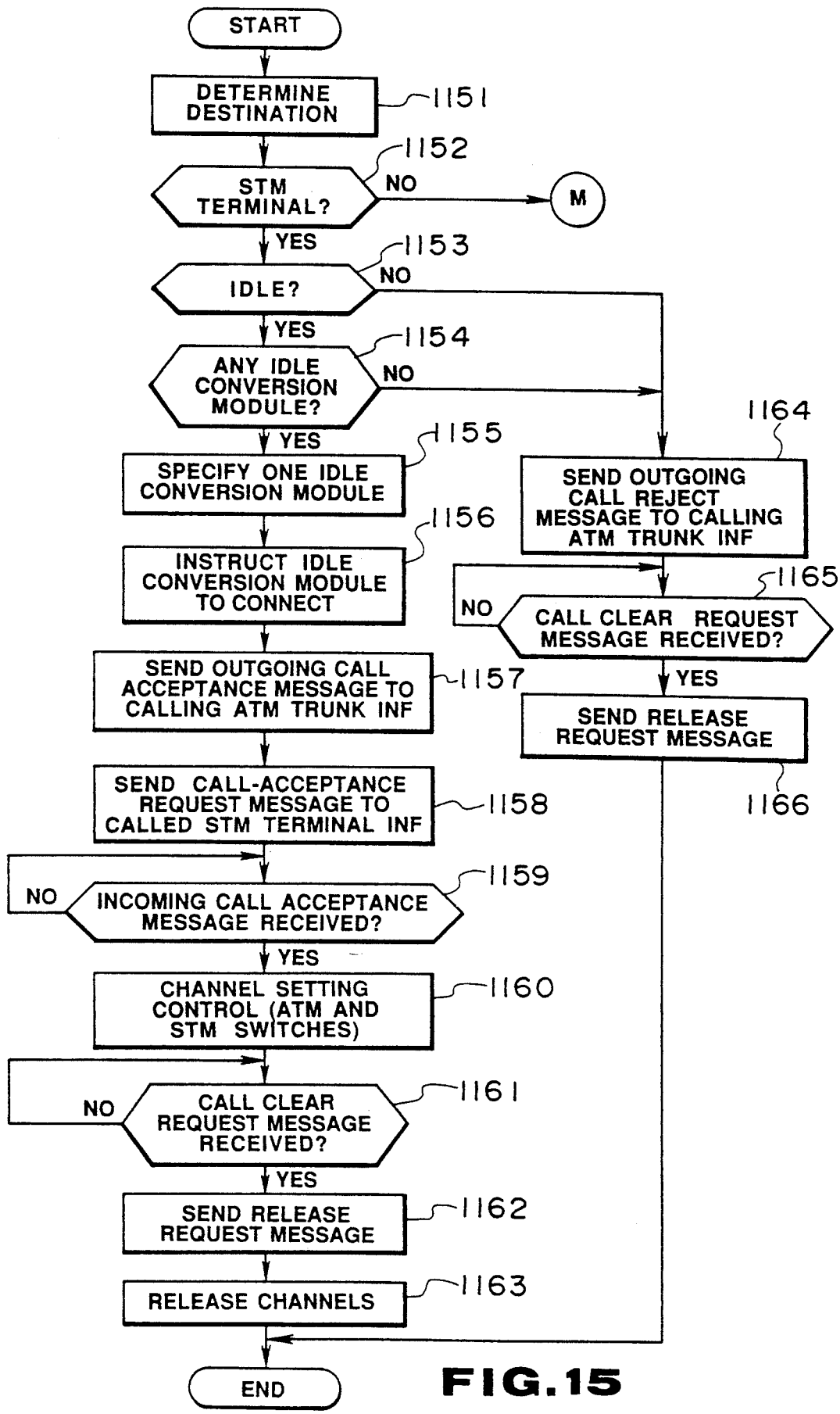

(14) When calling from an ATM trunk line to an STM terminal (FIG. 15)

The procedure of this case is substantially same as that of the above-described case (11) in which a call is made from an ATM terminal to an STM terminal. Accordingly, a detailed description will be omitted.

Figure 14:
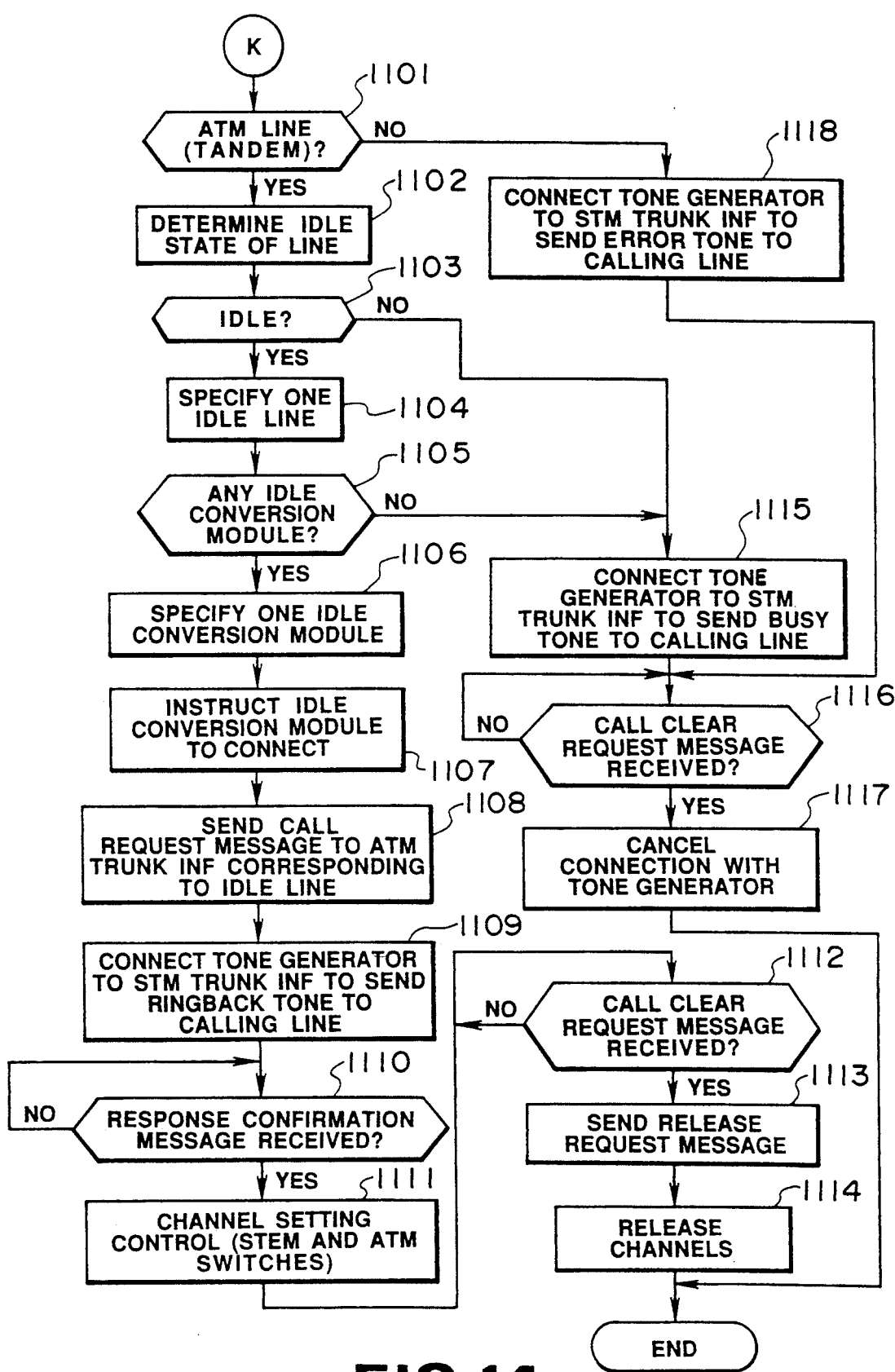

(15) When a tandem connection is made from an STM trunk line to an ATM trunk line (FIG. 14)

Here, a description will be given by citing an example in which a tandem connection is made from the STM trunk line 151 to an ATM trunk line. In addition, a description will be given by citing an example in which a call is received from another PBX via its exclusive-use trunk line.

First, the STM trunk INF 141 which has received a call request from the STM trunk line 151 discriminates a reception number, and transmits a call request message to the call control unit 101.

Here, if the call control unit 101 determines that the destination number is a terminal which is not directly connected to this exchange (Step 1101), the call control unit 101 detects if there is any idle ATM trunk line, specifies one idle line (Steps 1102–1104), and examines its call attribute.

If it is now assumed that the call attribute belongs to Group between the two groups of STM/ATM conversion function modules, and if the STM/ATM conversion function module 161 has been designated, the call control unit 101 designates the module 161 to effect a connection (Step 1107), sends a call request message to the ATM trunk INF (Step 1108), and controls the STM channel switch 102 so as to send a ringback tone to the calling STM trunk line 151 (Step 1109). Subsequently, upon receiving a response confirmation message from the ATM trunk line via the ATM trunk INF (Step 1110), the call control unit 101 instructs the STM channel switch 102 to set the STM channel between the STM trunk INF 141 and the STM//ATM conversion function module 151. Concurrently, the call control unit 101 instructs the ATM channel switch 103 to set the ATM channel between the ATM trunk INF 441 and the STM/ATM conversion function module, thereby effecting channel setting control (Step 1111).

Upon receiving the call-originating message, the ATM trunk INF 441 converts the message to a starting signal (calling signal) of the common-channel signalling method in the ATM system and sends the same to the ATM trunk line 451.

Thus, the ATM channel set in the STM channel switch 102 and the ATM trunk line 451 is connected, thereby completing connection processing.

Meanwhile, if the STM trunk INF 141 (or the ATM trunk INF 441) detects a disconnection signal from the STM trunk line 151 (or the ATM trunk line 451) (Step 1112), the STM trunk INF 141 (or the ATM trunk INF 441) sends a call clear request message to the call control unit 101.

As a result, the call control unit 101 releases the channels set in the STM channel switch 102 and the ATM channel switch 103, resets the STM/ATM conversion function module 161, and sends a release request message to the ATM trunk INF 441 (or the STM trunk INF 141) (Steps 1113, 1114).

Thus, the ATM trunk INF 441 (or the STM trunk INF 141) sends a disconnection signal of the ATM system (or the STM system) to the ATM trunk line 451 (or the STM trunk line 151), thereby completing call clear processing.

It should be noted that as for error processing in a case where there is an abnormality in the data of the call request message received by the STM trunk line 151, and as for busy processing in a case where there is no idle ATM trunk line or there is no idle module, the same processing as described above is effected.

Figure 16:
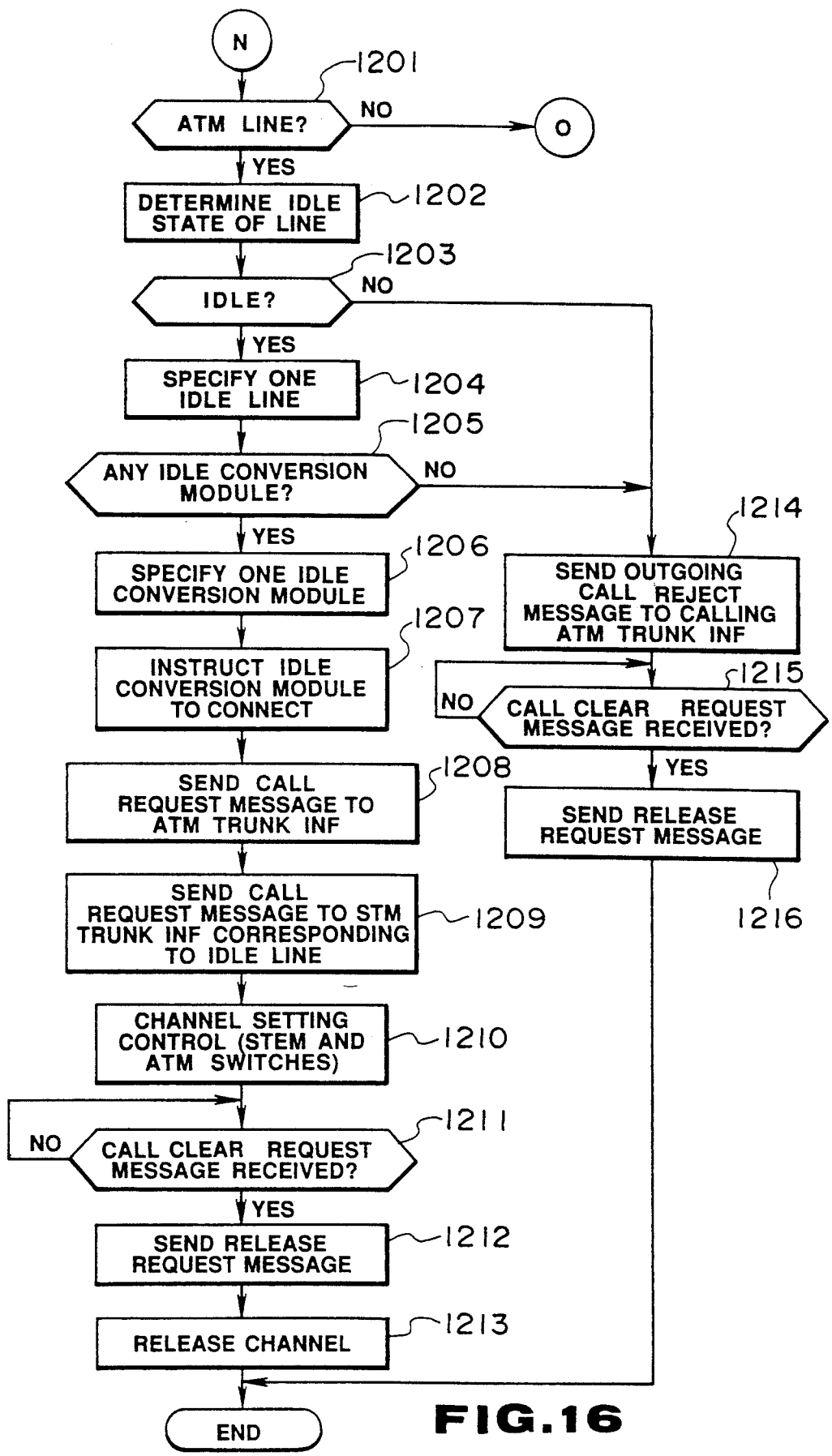

(16) When a tandem connection is made from an ATM trunk line to an STM trunk line (FIG. 16)

The procedure of this case is the same as the above-described case (15) in which a tandem connection is made from an ATM trunk line to an ATM trunk line.

Accordingly, although a detailed description will be omitted, the following readings are made in place of the description of case (15): The STM trunk line is read as the ATM trunk line; the STM trunk INF, as the ATM trunk INF; and the STM channel switch 102, as the ATM channel switch 103.

Although in the above-described embodiments two groups of modules which respectively match the voice system and the data system are provided as the STM/ATM conversion function modules, the present invention is not restricted to these systems. For instance, three or more groups of modules that are classified into smaller units for matching the attributes of calls may be provided in realizing the adaptation function and the cell conversion function. In addition, although in the above-described embodiments the arrangement provided is such that one STM channel switch 102 is connected to one ATM channel switch 103, a plurality of switches may be used, respectively. Furthermore, although the transmission of a tone signal to the STM system (terminals and lines) is effected by means of the tone generator connected to the called-side STM channel switch, the transmission may be effected by the calling-side tone generator, or may be generated independently by the STM terminal itself upon receipt of a control message as in the case of the ATM terminal. Thus, various modifications are possible without departing from the technical scope of the present invention.

What is claimed is:

1. An ATM exchange system in which STM terminals and STM trunk lines of an STM system and ATM terminals and ATM trunk lines of an ATM system are accommodated, comprising:
   an ATM channel switch for providing a direct exchange connection between an ATM terminal and an ATM trunk line;
   an STM channel switch for providing a direct exchange connection between an STM terminal and an STM trunk line;
   an STM/ATM conversion module disposed between the ATM channel switch and the STM channel switch, for converting a call of one system to that of another system when a call is made between an ATM terminal/line and an STM terminal/line; and
   call control means coupled to the ATM channel switch, the STM channel switch and the STM/ATM conversion module for controlling a call connection between a first ATM terminal, ATM trunk line, STM terminal or STM trunk line and a second ATM terminal, ATM trunk line, STM terminal or STM trunk line.

2. An ATM exchange system in which STM terminals and STM trunk lines of an STM system and ATM terminals and ATM trunk lines of an ATM system are accommodated, comprising:
   an ATM channel switch for providing a direct exchange connection between an ATM terminal and an ATM trunk line;
   an STM channel switch for providing a direct exchange connection between an STM terminal and an STM trunk line;
   STM/ATM conversion module disposed between the ATM channel switch and the STM channel switch, for converting a call of one system to that of another system when a call is made between an ATM terminal/line and an STM terminal/line; and
   call control means coupled to the ATM channel switch, the STM channel switch and the STM/ATM conversion module for controlling a call connection between a first ATM terminal, ATM trunk line, STM terminal or STM trunk line and a second ATM terminal, ATM trunk line, STM terminal or STM trunk line.
   wherein said call control means includes:
   detecting means for detecting a usage condition of the STM/ATM conversion modules when the call is made between an ATM terminal/line and an STM terminal/line, and
   control mans for effecting connection processing for connecting the ATM channel switch to the STM channel switch via the STM/ATM conversion module which is detected to be idle, and effecting busy processing if a busy state is detected.

3. An ATM exchange system comprising:
   an ATM channel switch for providing a direct exchange connection between ATM terminals and STM trunk lines;
   an STM channel switch for providing a direct exchange connection between STM terminals and STM trunk lines;
   STM/ATM conversion modules disposed between the ATM channel switch and the STM channel switch, for converting a call of a mutually different system and for connecting the ATM channel switch to the STM channel switch; and
   call control means coupled to the ATM channel switch, the STM channel switch and the STM/ATM conversion module for controlling a call connection between a first ATM terminal, ATM trunk line, STM terminal or STM trunk line and a second ATM terminal, ATM trunk line, STM terminal or STM trunk line;
   wherein said call control means detects a usage condition of the STM/ATM conversion modules when a call of a mutually different system is made, and controls connection processing via the STM/ATM conversion modules.

4. An ATM exchange system comprising:
   an ATM channel switch for providing a direct exchange between an ATM terminal and an ATM trunk line;
   an STM channel switch for providing a direct exchange connection between an STM terminal and an STM trunk line;
   a first group of STM/ATM conversion modules disposed between the ATM channel switch and the STM channel switch for exchanging a call of a mutually different system concerning a call of a first attribute and connecting the ATM channel switch to the STM channel switch;
   a second group of STM/ATM conversion modules disposed between the ATM channel switch and the STM channel switch for exchanging a call of a mutually different system concerning a call of a second attribute and connecting the ATM channel switch and the STM channel switch; and
   a call control unit for detecting a usage condition of the group of STM/ATM conversion modules corresponding to the attribute of a call when a call of a mutually different system is called, and controlling connection processing via an STM/ATM conversion module selected from a group of STM/ATM conversion modules corresponding to the attribute of that call.

5. The ATM exchange system according to claim 4, wherein the call control unit comprises:
    detecting means for detecting the usage condition of the first or second group of STM/ATM conversion modules corresponding to the attribute of the call of the mutually different system; and
    control means for effecting connection processing for connecting the ATM channel switch to the STM channel switch via the STM/ATM conversion module selected from one of the first or second group of STM/ATM conversion modules which is detected to be idle, and effecting busy processing if a busy state is detected.

6. The ATM exchange system according to claim 4, wherein the call control unit comprises:
    means for determining a calling party;
    means for determining a called party; and
    control means for selectively controlling the ATM channel switch, the STM channel switch, and the first or second group of STM/ATM conversion modules in response to a result of a determination by the calling-party determining means and a result of a determination by the called-party determining means.

7. The ATM exchange system according to claim 4 further comprising a tone generator connected to the STM channel switch for generating various tone signals, wherein the call control unit executes connection control of a call between a first ATM terminal, ATM trunk line, STM terminal or STM trunk line and a second ATM terminal, ATM trunk line, STM terminal or STM trunk line by controlling the ATM channel switch, the STM channel switch, the tone generator, and the first or second group of STM/ATM conversion modules.

8. An ATM exchange system comprising:
    an ATM channel switch for providing a direct exchange connection between ATM terminals and ATM trunk lines; an STM channel switch for providing a direct exchange connection between STM terminals and STM trunk lines, a tone generator connected to the STM channel switch, for generating various tone signals;
    an STM/ATM conversion module disposed between the ATM channel switch and the STM channel switch, for converting a call of a mutually different system and for connecting the ATM channel switch to the STM channel switch; and
    call control means coupled to the ATM channel switch, the STM channel switch and the STM/ATM conversion module for executing connection control of a call between a first ATM terminal, ATM trunk line, STM terminal, or STM trunk line and a second ATM terminal, ATM trunk line, STM terminal or STM trunk line by controlling the ATM channel switch, the STM channel switch, the tone generator, and the STM/ATM conversion module.

* * * * *